United States Patent
Saha et al.

(10) Patent No.: US 11,672,025 B2
(45) Date of Patent: Jun. 6, 2023

(54) RANDOM ACCESS FOR AERIAL USER EQUIPMENTS IN CONNECTED MODE

(71) Applicant: QUALCOMM Incorporated, San Diego, CA (US)

(72) Inventors: Chiranjib Saha, San Diego, CA (US); Alberto Rico Alvarino, San Diego, CA (US); Umesh Phuyal, San Diego, CA (US); Le Liu, Fremont, CA (US); Kazuki Takeda, Tokyo (JP)

(73) Assignee: QUALCOMM Incorporated, San Diego, CA (US)

( * ) Notice: Subject to any disclaimer, the term of this patent is extended or adjusted under 35 U.S.C. 154(b) by 90 days.

(21) Appl. No.: 17/461,611

(22) Filed: Aug. 30, 2021

(65) Prior Publication Data
US 2023/0060998 A1    Mar. 2, 2023

(51) Int. Cl.
*H04W 74/08*  (2009.01)
*H04W 74/00*  (2009.01)
*H04W 84/06*  (2009.01)

(52) U.S. Cl.
CPC ..... *H04W 74/0841* (2013.01); *H04W 74/006* (2013.01); *H04W 74/0866* (2013.01); *H04W 84/06* (2013.01)

(58) Field of Classification Search
CPC .......... H04W 74/0841; H04W 74/006; H04W 74/0866; H04W 84/00
See application file for complete search history.

(56) References Cited

U.S. PATENT DOCUMENTS

| | | | |
|---|---|---|---|
| 2021/0352559 A1* | 11/2021 | Casamayón Antón | ...................... H04B 7/0617 |
| 2022/0038139 A1* | 2/2022 | Eriksson Löwenmark | ................. H04B 7/18513 |
| 2022/0046486 A1* | 2/2022 | Shrestha | ............... H04W 12/03 |

(Continued)

FOREIGN PATENT DOCUMENTS

WO    WO-2021022496 A1    2/2021

OTHER PUBLICATIONS

Apple: "Time and Frequency Synchronization in IoT NTN", R1-2105139, 3GPP TSG RAN WG1 #105-e, 3rd Generation partnership Project, Mobile Competence Centre, 650, Route Des Lucioles, F-06921 Sophia-Antipolis Cedex, France, vol. RAN WG1, No. e-Meeting, May 10, 2021-May 27, 2021, May 12, 2021, 3 Pages, XP052011227, Section 2, p. 2.

(Continued)

*Primary Examiner* — Kashif Siddiqui
(74) *Attorney, Agent, or Firm* — Qualcomm Incorporated

(57) ABSTRACT

Methods, systems, and devices for wireless communications are described. In a wireless communications system, a base station may transmit an indication of a pre-compensation timing value for transmission of a random access message by an aerial user equipment (UE), the random access message part of a random access procedure between the base station and the aerial UE when the aerial UE is in a connected state. The pre-compensation timing value may be based on a location of the aerial UE. In some examples, the base station may monitor a set of random access resources associated with the pre-compensation timing value and the aerial UE for the random access message, and the aerial UE may transmit the random access message using a first random access resource of a set of random access resources (Continued)

associated with the pre-compensation timing value and the aerial UE.

30 Claims, 17 Drawing Sheets

(56) References Cited

U.S. PATENT DOCUMENTS

| | | | |
|---|---|---|---|
| 2022/0086780 A1* | 3/2022 | Tsai | H04W 56/006 |
| 2022/0159732 A1 | 5/2022 | You et al. | |
| 2022/0217790 A1* | 7/2022 | Qiu | H04W 56/0045 |
| 2022/0264662 A1* | 8/2022 | Xu | H04L 5/0048 |

OTHER PUBLICATIONS

International Search Report and Written Opinion—PCT/US2022/040744—ISA/EPO—dated Nov. 16, 2022.
OPPO: "Discussion on Enhancement of UL Time and Frequency Synchronization", R1-2102398, 3rd Generation Partnership Project, Mobile Competence Centre, 650, Route Des Lucioles, F-06921 Sophia-Antipolis Cedex, France, vol. RAN WG1, No. e-Meeting, Apr. 12, 2021-Apr. 20, 2021, Apr. 7, 2021, XP052177115, Section 2.1, p. 1-p. 2, Section 2.2, p. 2.

* cited by examiner

RANDOM ACCESS FOR AERIAL USER EQUIPMENTS IN CONNECTED MODE

FIELD OF TECHNOLOGY

The following relates to wireless communications, including random access for aerial user equipments (UEs) in a connected mode.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

The described techniques relate to improved methods, systems, devices, and apparatuses that support random access for aerial user equipments (UEs) in a connected mode. Generally, the described techniques provide for an aerial UE in a connected mode (e.g., a connected state) to use improved random access channel (RACH) procedures. In some examples, a base station may transmit an indication of a pre-compensation timing value (e.g., $t_{pre}$) for a UE (e.g., an aerial UE) to use for the transmission of a random access message. The random access message may be part of a RACH procedure between the base station and the UE while the UE is in the connected mode, and the pre-compensation timing value may be based on the location of the UE. The UE may transmit the random access message using a first random access resource of a set of random access resources associated with the pre-compensation timing value and the UE, and the base station may monitor a set of random access resources associated with the pre-compensation timing value and the UE for the random access message. In some examples, the base station may broadcast signaling indicating multiple pre-compensation timing values to one or more UEs, where the pre-compensation timing values may be associated with one or more zones supported by the base station (e.g., aerial coverage zones). Additionally or alternatively, the UE may determine (e.g., calculate) the pre-compensation timing value based on the location of the UE, the location of the base station, or both.

A method for wireless communications at a base station is described. The method may include transmitting an indication of a pre-compensation timing value for transmission of a random access message by an aerial UE, the random access message being part of a random access procedure between the base station and the aerial UE, where the pre-compensation timing value is based on a location of the aerial UE and monitoring a set of random access resources for the random access message based on the indication, the set of random access resources associated with the pre-compensation timing value and the aerial UE.

An apparatus for wireless communications at a base station is described. The apparatus may include a processor, memory coupled with the processor, and instructions stored in the memory. The instructions may be executable by the processor to cause the apparatus to transmit an indication of a pre-compensation timing value for transmission of a random access message by an aerial UE, the random access message being part of a random access procedure between the base station and the aerial UE, where the pre-compensation timing value is based on a location of the aerial UE and monitor a set of random access resources for the random access message based on the indication, the set of random access resources associated with the pre-compensation timing value and the aerial UE.

Another apparatus for wireless communications at a base station is described. The apparatus may include means for transmitting an indication of a pre-compensation timing value for transmission of a random access message by an aerial UE, the random access message being part of a random access procedure between the base station and the aerial UE, where the pre-compensation timing value is based on a location of the aerial UE and means for monitoring a set of random access resources for the random access message based on the indication, the set of random access resources associated with the pre-compensation timing value and the aerial UE.

A non-transitory computer-readable medium storing code for wireless communications at a base station is described. The code may include instructions executable by a processor to transmit an indication of a pre-compensation timing value for transmission of a random access message by an aerial UE, the random access message being part of a random access procedure between the base station and the aerial UE, where the pre-compensation timing value is based on a location of the aerial UE and monitor a set of random access resources for the random access message based on the indication, the set of random access resources associated with the pre-compensation timing value and the aerial UE.

In some examples of the method, apparatuses, and non-transitory computer-readable medium described herein, transmitting the indication of the pre-compensation timing value may include operations, features, means, or instructions for transmitting the indication of the pre-compensation timing value for transmission of the random access message by the aerial UE, the random access message being part of the random access procedure between the base station and the aerial UE when the aerial UE may be in a connected state.

In some examples of the method, apparatuses, and non-transitory computer-readable medium described herein, transmitting the indication of the pre-compensation timing value may include operations, features, means, or instructions for transmitting, to the aerial UE, the indication of the pre-compensation timing value via radio resource control (RRC) signaling, a medium access control (MAC) control element (MAC-CE), or downlink control information (DCI), where the pre-compensation timing value may be specific to the aerial UE.

In some examples of the method, apparatuses, and non-transitory computer-readable medium described herein, transmitting the indication of the pre-compensation timing value may include operations, features, means, or instructions for transmitting an index corresponding to the pre-compensation timing value for transmission of the random access message by the aerial UE.

In some examples of the method, apparatuses, and non-transitory computer-readable medium described herein, transmitting the indication of the pre-compensation timing value may include operations, features, means, or instructions for transmitting broadcast signaling indicating a set of multiple zones and corresponding zone identifiers, where each zone of the set of multiple zones may be associated with a respective pre-compensation timing value for transmission of the random access message by the aerial UE.

Some examples of the method, apparatuses, and non-transitory computer-readable medium described herein may further include operations, features, means, or instructions for transmitting, to the aerial UE and via a dedicated RRC message, an indication to activate a zone identifier for the aerial UE.

Some examples of the method, apparatuses, and non-transitory computer-readable medium described herein may further include operations, features, means, or instructions for transmitting, to the aerial UE and via a MAC-CE or DCI, a bitmap to activate a zone identifier for the aerial UE.

Some examples of the method, apparatuses, and non-transitory computer-readable medium described herein may further include operations, features, means, or instructions for maintaining a list including the set of multiple zones and the respective pre-compensation timing values based on one or more measurements associated with one or more aerial UEs.

In some examples of the method, apparatuses, and non-transitory computer-readable medium described herein, each pre-compensation timing value corresponds to a minimum value for pre-compensation for a respective zone for a random access preamble transmission.

Some examples of the method, apparatuses, and non-transitory computer-readable medium described herein may further include operations, features, means, or instructions for receiving a capability message from the aerial UE, the capability message indicating a capability of the aerial UE to measure the location of the aerial UE, to apply a pre-compensation timing value, or both.

Some examples of the method, apparatuses, and non-transitory computer-readable medium described herein may further include operations, features, means, or instructions for transmitting a second message of the random access procedure after monitoring the set of random access resources for the random access message, the second message indicating a timing pre-compensation of the random access message.

In some examples of the method, apparatuses, and non-transitory computer-readable medium described herein, transmitting the indication of the pre-compensation timing value may include operations, features, means, or instructions for transmitting signaling indicating a location of the base station via system information or dedicated RRC signaling.

In some examples of the method, apparatuses, and non-transitory computer-readable medium described herein, transmitting the indication of the pre-compensation timing value may include operations, features, means, or instructions for transmitting signaling configuring the aerial UE with a pre-compensation timing value offset.

Some examples of the method, apparatuses, and non-transitory computer-readable medium described herein may further include operations, features, means, or instructions for receiving, based on completion of the random access procedure, a report indicating the pre-compensation timing value determined or used by the aerial UE.

A method for wireless communications at an aerial UE is described. The method may include receiving an indication of a pre-compensation timing value for transmission of a random access message by the aerial UE, the random access message being part of a random access procedure between a base station and the aerial UE, where the pre-compensation timing value is based on a location of the aerial UE and transmitting, based on receiving the indication, the random access message using a first random access resource of a set of random access resources associated with the pre-compensation timing value and the aerial UE.

An apparatus for wireless communications at an aerial UE is described. The apparatus may include a processor, memory coupled with the processor, and instructions stored in the memory. The instructions may be executable by the processor to cause the apparatus to receive an indication of a pre-compensation timing value for transmission of a random access message by the aerial UE, the random access message being part of a random access procedure between a base station and the aerial UE, where the pre-compensation timing value is based on a location of the aerial UE and transmit, based on receiving the indication, the random access message using a first random access resource of a set of random access resources associated with the pre-compensation timing value and the aerial UE.

Another apparatus for wireless communications at an aerial UE is described. The apparatus may include means for receiving an indication of a pre-compensation timing value for transmission of a random access message by the aerial UE, the random access message being part of a random access procedure between a base station and the aerial UE, where the pre-compensation timing value is based on a location of the aerial UE and means for transmitting, based on receiving the indication, the random access message using a first random access resource of a set of random access resources associated with the pre-compensation timing value and the aerial UE.

A non-transitory computer-readable medium storing code for wireless communications at an aerial UE is described. The code may include instructions executable by a processor to receive an indication of a pre-compensation timing value for transmission of a random access message by the aerial UE, the random access message being part of a random access procedure between a base station and the aerial UE, where the pre-compensation timing value is based on a location of the aerial UE and transmit, based on receiving the indication, the random access message using a first random access resource of a set of random access resources associated with the pre-compensation timing value and the aerial UE.

In some examples of the method, apparatuses, and non-transitory computer-readable medium described herein, receiving the indication of the pre-compensation timing value may include operations, features, means, or instructions for receiving the indication of the pre-compensation timing value for transmission of the random access message by the aerial UE, the random access message being part of the random access procedure between the base station and the aerial UE when the aerial UE may be in a connected state.

In some examples of the method, apparatuses, and non-transitory computer-readable medium described herein, receiving the indication of the pre-compensation timing value may include operations, features, means, or instructions for receiving signaling indicating a location of the base station via system information or dedicated RRC signaling and determining the pre-compensation timing value based on the location of the base station.

In some examples of the method, apparatuses, and non-transitory computer-readable medium described herein, receiving the indication of the pre-compensation timing value may include operations, features, means, or instructions for receiving signaling configuring the aerial UE with a pre-compensation timing value offset and determining the pre-compensation timing value based on the pre-compensation timing value offset.

Some examples of the method, apparatuses, and non-transitory computer-readable medium described herein may further include operations, features, means, or instructions for determining the pre-compensation timing value based on the location of the base station and the location of the aerial UE.

Some examples of the method, apparatuses, and non-transitory computer-readable medium described herein may further include operations, features, means, or instructions for transmitting, based on completion of the random access procedure, a report indicating the pre-compensation timing value determined by the aerial UE.

Some examples of the method, apparatuses, and non-transitory computer-readable medium described herein may further include operations, features, means, or instructions for transmitting the random access message using the pre-compensation timing value via a second random access resource of the set of random access resources based on the pre-compensation timing value being available at the aerial UE and transmitting the random access message via a third random access resource of the set of random access resources based on the pre-compensation timing value being unavailable at the aerial UE.

Some examples of the method, apparatuses, and non-transitory computer-readable medium described herein may further include operations, features, means, or instructions for transmitting a capability message from the aerial UE, the capability message indicating a capability of the aerial UE to measure the location of the aerial UE, to apply a pre-compensation timing value, or both.

In some examples of the method, apparatuses, and non-transitory computer-readable medium described herein, receiving the indication of the pre-compensation timing value may include operations, features, means, or instructions for receiving, from the base station, the indication of the pre-compensation timing value via RRC signaling, a MAC-CE, or DCI, where the pre-compensation timing value may be specific to the aerial UE.

In some examples of the method, apparatuses, and non-transitory computer-readable medium described herein, receiving the indication of the pre-compensation timing value may include operations, features, means, or instructions for receiving an index corresponding to the pre-compensation timing value for transmission of the random access message by the aerial UE.

In some examples of the method, apparatuses, and non-transitory computer-readable medium described herein, receiving the indication of the pre-compensation timing value may include operations, features, means, or instructions for receiving broadcast signaling indicating a set of multiple zones and corresponding zone identifiers, where each zone of the set of multiple zones may be associated with a respective pre-compensation timing value for transmission of the random access message by the aerial UE.

Some examples of the method, apparatuses, and non-transitory computer-readable medium described herein may further include operations, features, means, or instructions for receiving, from the base station and via a dedicated RRC message, an indication to activate a zone identifier for the aerial UE.

Some examples of the method, apparatuses, and non-transitory computer-readable medium described herein may further include operations, features, means, or instructions for receiving, from the base station and via a MAC-CE or DCI, a bitmap to activate a zone identifier for the aerial UE.

In some examples of the method, apparatuses, and non-transitory computer-readable medium described herein, each pre-compensation timing value corresponds to a minimum value for pre-compensation for a respective zone for a random access preamble transmission.

Some examples of the method, apparatuses, and non-transitory computer-readable medium described herein may further include operations, features, means, or instructions for receiving a second message of the random access procedure after transmitting the random access message, the second message indicating a timing pre-compensation of the random access message.

DETAILED DESCRIPTION

Figure 1:
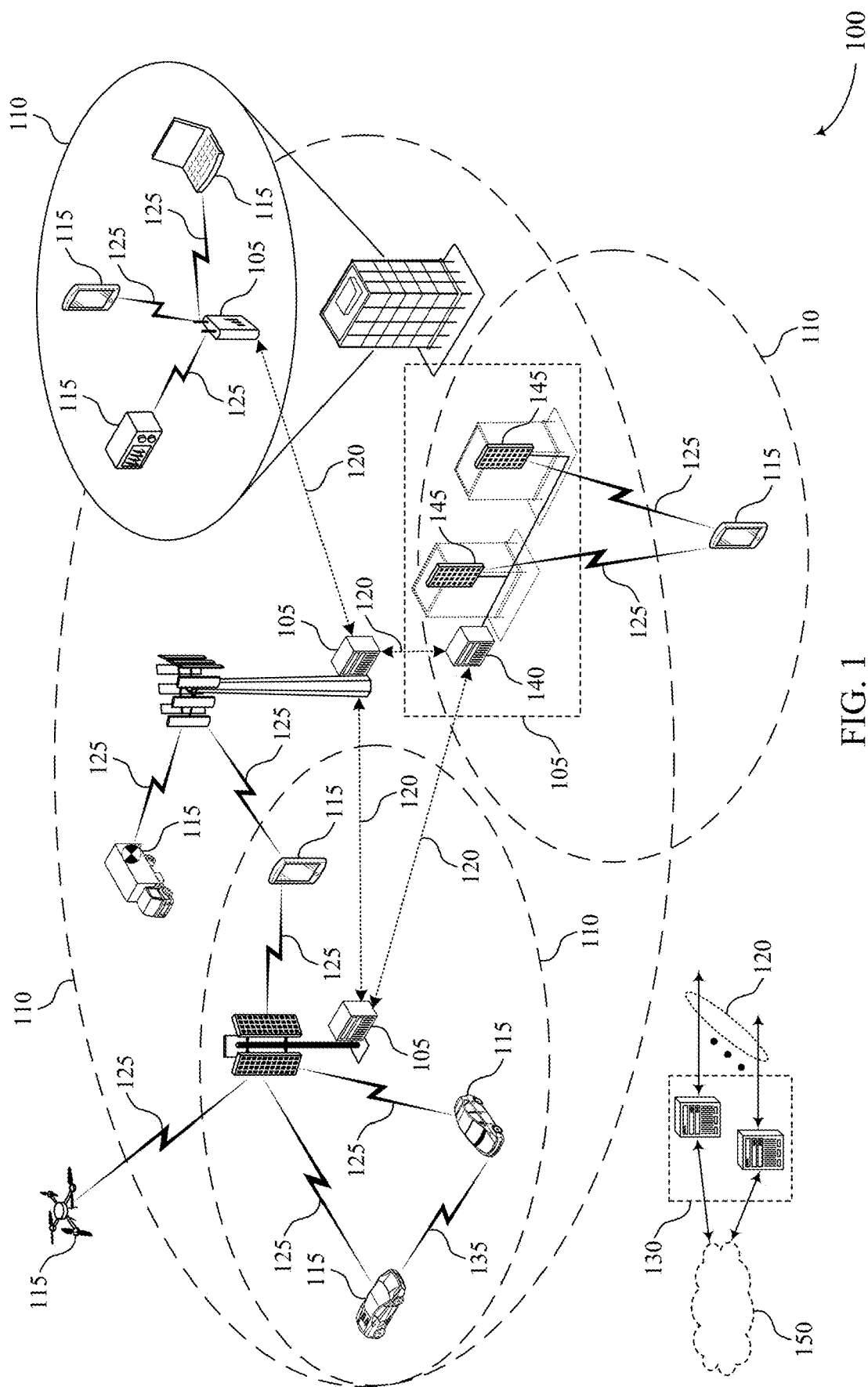
FIG. 1 illustrates an example of a wireless communications system that supports random access for aerial UEs in a connected mode in accordance with aspects of the present disclosure.

A wireless multiple-access communications system may include a number of base stations or network access nodes, each simultaneously supporting communication for multiple communication devices, which may be otherwise known as user equipment (UEs). In some wireless communications systems, the UEs may include aerial UEs which may be devices capable of flying or maneuvering through the air. One example of an aerial UE is an unmanned aerial vehicle (UAV), which may also be referred to as a drone. Some aerial UEs may support uplink or downlink communications with one or more base stations or sidelink communications with each other.

In some examples, a base station may support different coverage areas for terrestrial and aerial communications. For example, the base station may cover a larger aerial coverage (e.g., a volume) than a terrestrial coverage (e.g., an area). During a random access channel (RACH) procedure, a UE may transmit preambles in a random access message (e.g., Msg1, MsgA) to establish communications with the base station. However, due to the different coverage areas supported by the base station, an aerial UE may transmit a random access message with a longer propagation delay to reach the base station than a terrestrial UE. As such, aerial UEs in a radio resource control (RRC) connected mode may transmit a random access message slowly depending on the locations of the base station and the aerial UE, which may increase latency and reduce transmission speeds. Further, while a terrestrial UE may use a timing advance to perform a RACH procedure, an aerial UE may be a sufficiently large distance from the base station such that the preambles used to calculate the timing advance may be insufficient for the aerial UE. As such, it may be beneficial to apply a pre-compensation timing value before performing a RACH procedure so an aerial UE may reuse random access resources used by terrestrial UEs.

Techniques described herein enable an aerial UE in a connected mode (e.g., a connected state) to use improved RACH procedures. In some examples, a base station may transmit an indication of a pre-compensation timing value (e.g., $t_{pre}$) for a UE (e.g., an aerial UE) to use for the transmission of a random access message. The random access message may be part of a RACH procedure between the base station and the UE while the UE is in the connected mode, and the pre-compensation timing value may be based on the location of the UE. The UE may transmit the random access message using a first random access resource of the set of random access resources associated with the pre-compensation timing value and the UE, and the base station may monitor a set of random access resources associated with the pre-compensation timing value and the UE for the random access message. In some examples, the base station may broadcast signaling indicating multiple pre-compensation timing values to one or more UEs, where the pre-compensation timing values may be associated with one or more zones supported by the base station (e.g., aerial coverage zones). Additionally or alternatively, the UE may determine (e.g., calculate) the pre-compensation timing value based on the location of the UE, the location of the base station, or both.

Particular aspects of the subject matter described herein may be implemented to realize one or more advantages. The described techniques may support improvements in RACH procedures for aerial UEs in a connected mode. For example, in some cases, the described techniques may enable the UE to transmit a random access message associated with a RACH procedure with a reduced propagation delay, which may reduce latency and improve user experience. As such, supported techniques may include improved network operations, and, in some examples, may promote network efficiencies, among other benefits.

Aspects of the disclosure are initially described in the context of wireless communications systems. Aspects of the disclosure are then described in the context of process flows. Aspects of the disclosure are further illustrated by and described with reference to apparatus diagrams, system diagrams, and flowcharts that relate to random access for aerial UEs in a connected mode.

FIG. 1 illustrates an example of a wireless communications system 100 that supports random access for UEs in a connected mode in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or fifth generation (5G) core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A medium access control (MAC) layer may perform priority handling and multiplexing of logical channels into transport channels. The MAC layer may also use error detection techniques, error correction techniques, or both to support retransmissions at the MAC layer to improve link efficiency. In the control plane, the RRC protocol layer may provide establishment, configuration, and maintenance of an RRC connection between a UE 115 and a base station 105 or a core network 130 supporting radio bearers for user plane data. At the physical layer, transport channels may be mapped to physical channels.

The wireless communications system 100 may include a number of base stations 105 or network access nodes, each simultaneously supporting communication for multiple communication devices, such as UEs 115. In some wireless communications systems 100, the UEs 115 may include aerial UEs which may be devices capable of flying or maneuvering through the air. One example of an aerial UE is a UAV, which may also be referred to as a drone. In some examples, the aerial UEs may communicate with aerial UE controllers, which may be referred to as UAV controllers (UAVCs), that may control the aerial UEs (e.g., using the Internet, Bluetooth, or any form of radio frequency communications). Additionally or alternatively, the aerial UEs may be configured with radio access network (RAN) equipment and may communicate with base stations 105 or other network entities via the RAN (e.g., using 3rd Generation Partnership Project (3GPP) technologies, such as 5G NR networks). Some aerial UEs may support uplink or downlink communications with one or more base stations 105 or sidelink communications with each other.

An aerial UE may comprise at least two separate entities or components. A flight-related component may perform some or all of the functions of flying, maneuvering (e.g., to avoid obstacles), navigation, landing, and takeoff and may include a power source (e.g., a battery or hydrogen cell), electric or other types of motors, propellers, sensors and controllers. A communications-related component may perform functions associated with communication with a ground controller or with other entities such as the wireless communication system 100 and may employ wireless technologies like 4G LTE, 5G NR, or both. The communications-related component may perform functions common to a non-aerial wireless device such as a smartphone, tracking device or IoT device and may be referred to as a UE 115. The two components may share some resources (e.g., power source, processor and memory) and may coordinate and interact to control a flight path, navigation, and maneuvering of the aerial UE. As discussed herein, an aerial UE can refer to just the communications-related component, just the flight-related component, or to both components. An aerial UE may be a UAV and the two terms are used interchangeably herein.

In some examples, when a UE 115 (e.g., an aerial UE) is in an RRC-connected mode, the UE 115 may perform a random access procedure. For example, the UE 115 may perform contention-free random access, where a dedicated RACH configuration may be optional for connected UEs 115 (e.g., UEs in an RRC-connected mode). That is, the UE 115 may perform contention-free random access if the base station 105 configures the UE 115 with the dedicated RACH configuration. In contention-free random access, the base station 105 may transmit a random access preamble assignment to the UE 115. In response, the UE 115 may transmit a random access preamble (e.g., Msg1) to the base station 105, and the base station 105 may transmit a random access response (e.g., Msg2) to the UE 115. In some examples, the UE 115 may perform contention-based random access if the base station 105 refrains from configuring the UE 115 contention-free random access. In contention-based random access, the UE 115 may transmit a random access preamble (e.g., Msg1) to the base station 105. The base station 105 may transmit a random access response (e.g., Msg2) to the UE 115, and in response, the UE 115 may schedule a physical uplink shared channel (PUSCH) transmission (e.g., Msg3) with the base station 105. The base station 105 may then communicate a contention resolution (e.g., Msg4) to the UE 115.

A random access procedure may be triggered by a number of events. For example, a UE 115 may perform a random access procedure to gain random access from an idle state (e.g., RRC_IDLE). The UE 115 may also use a random access procedure during an RRC-connection reestablishment procedure, or upon downlink or uplink data arrival during a connected state (e.g., RRC_CONNECTED) when the uplink synchronization status of the UE 115 is "non-synchronized." In some examples, the random access procedure may be triggered upon uplink data arrival during a connected state (e.g., RRC_CONNECTED) when the UE 115 lacks physical uplink control channel (PUCCH) resources for a scheduling request. Additionally or alternatively, the random access procedure may be triggered upon a scheduling request failure, based on a request via RRC signaling upon a synchronous reconfiguration (e.g., handover), or based on the UE 115 transitioning from an inactive state (e.g., RRC_INACTIVE). In some examples, the random access procedure may be triggered to establish time alignment for a secondary timing advance group (TAG), and if measurement reports are used for adding a secondary cell. In some cases, the UE 115 may request other system information, may perform a beam failure recovery procedure, or may experience consistent uplink listen-before-talk (LBT) failure on a special cell (Spcell), which may each trigger a random access procedure.

In some examples, a random access procedure may be triggered based on a handover procedure for the UE 115 with a source base station and a target base station (e.g., two or more base stations 105). For example, the source base station may initiate a handover and issue a handover request (e.g., HANDOVER REQUEST) to the target base station over an Xn interface. The target base station may perform admission control and may provide a new RRC configuration as part of an acknowledgement of the handover request (e.g., HANDOVER REQUEST ACKNOWLEDGEMENT). In some cases, the source base station may provide the RRC configuration to the UE 115 by forwarding an RRC reconfiguration message received in the acknowledgement (e.g., RRCReconfiguration). The RRC reconfiguration message may include at least a cell identifier (ID) and information used to access the target cell such that the UE 115 may access the target cell while refraining from reading system information. In some cases, the information used for contention-based random access and contention-free random access may be included in the RRC reconfiguration message. The access information to the target cell may include beam-specific information, if any. In some examples, based on receiving the RRC reconfiguration message, the UE 115 may perform the random access procedure with the target base station, where the UE 115 may move the RRC connection to the target base station (e.g., switch to a new cell) and reply to the target base station with a completion message (e.g., RRCReconfigurationComplete).

In some examples, a UE 115 (e.g., an aerial UE) in an RRC-connected mode may transmit Msg1 (e.g., MsgA) as part of a RACH procedure, where the Msg1 may be a preamble of the first message transmitted in the RACH procedure. The UE 115 may receive a timing reference from a downlink frame transmitted by a base station 105. The downlink frame may take a time of $t_1$ to reach the UE 115, where $t_1 = d_1/c$, $d_1$ may represent the distance between the UE 115 and the base station 105, and c may represent the speed of light. In some cases, the UE 115 may align an uplink random access preamble transmission with the downlink frame timing. The UE 115 may then transmit, and the base station 105 may receive, the random access preamble with a delay of $t_1$ (e.g., a propagation delay). As such, the UE 115 and the base station 105 may experience a total round-trip delay of $2t_1$ between the base station 105 transmitting the timing reference and the base station 105 receiving the random access preamble (e.g., the Msg1).

To reduce the round-trip delay and increase communication speeds, the techniques described herein enable the UE 115 (e.g., an aerial UE) in a connected mode to use improved RACH procedures. In some examples, a base station 105 may transmit an indication of a pre-compensation timing value (e.g., $t_{pre}$) for the UE 115 to use for the transmission of a random access message. The random access message may be part of a RACH procedure between the base station 105 and the UE 115 while the UE 115 is in the connected mode (e.g., RRC_CONNECTED), and the pre-compensation timing value may be based on the location of the UE 115. The UE 115 may transmit the random access message using a first random access resource of a set of random access resources associated with the pre-compensation timing value and the UE 115, and the base station 105 may monitor a set of random access resources associated with the pre-compensation timing value and the UE 115 for the random access message. In some examples, the base station 105 may broadcast signaling indicating multiple pre-compensation timing values to one or more UEs 115, where the pre-compensation timing values may be associated with one or more zones supported by the base station 105 (e.g., aerial coverage zones). Additionally or alternatively, the UE 115 may determine (e.g., calculate) the pre-compensation timing value based on the location of the UE 115, the location of the base station 105, or both.

Figure 2:
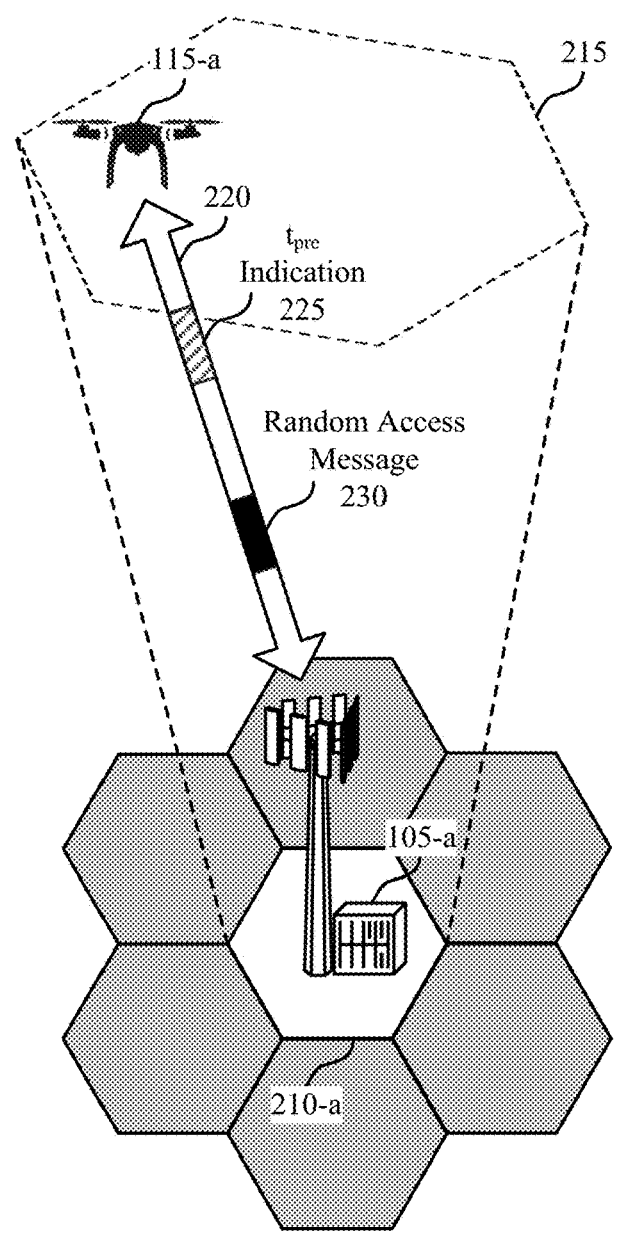
FIG. 2 illustrates an example of a wireless communications system that supports random access for aerial UEs in a connected mode in accordance with aspects of the present disclosure.
Figure 2:
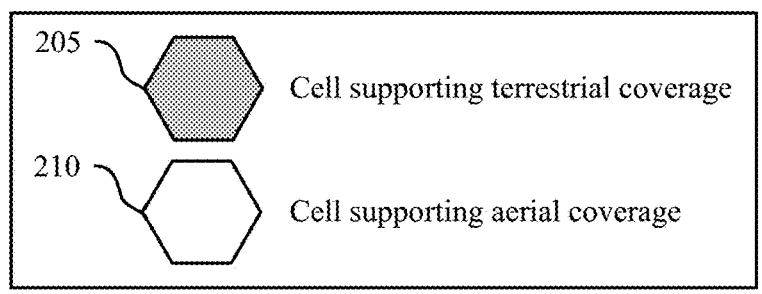

FIG. 2 illustrates an example of a wireless communications system 200 that supports random access for aerial UEs in a connected mode in accordance with aspects of the present disclosure. In some examples, the wireless communications system 200 may implement aspects of the wireless communications system 100 or may be implemented by aspects of the wireless communications system 100. For example, the wireless communications system 200 may include a base station 105-*a* and a UE 115-*a*, which may be examples of corresponding devices described herein. The wireless communications system 200 may include features for improved communications between the base station 105-*a* and the UE 115-*a*, among other benefits.

In some cases, terrestrial and aerial coverage footprints of a cell may differ. For example, the wireless communications system 200 may include one or more cells 205 which may support terrestrial coverage and cells 210 (e.g., a cell 210-*a*) which may support aerial coverage. That is, the cells 205 may support coverage for an area on the ground, and the cell 210-*a* may support an aerial coverage zone 215, which may be a volume above the cell 210-*a* and may be larger than the area on the ground covered by the cells 205. Because of the different coverage footprints, an aerial UE may transmit preambles with longer propagation delays to reach the base station 105-*a* than a terrestrial UE during random access.

The wireless communications system 200 may implement techniques for improved random access for aerial UEs in a connected mode (e.g., a connected state). For example, the wireless communications system 200 may support a RACH procedure between the base station 105-*a* and the UE 115-*a*, where the UE 115-*a* may be an aerial UE. In some examples, the UE 115-*a* may communicate with the base station 105-*a* via a communications link 220, which may be supported by the cell 210-*a*. As such, the UE 115-*a* may be in the aerial coverage zone 215. The base station 105-*a* may transmit an indication 225 of a pre-compensation timing value (e.g., $t_{pre}$) for the UE 115-*a* to use for the transmission of a random access message 230. The random access message 230 may be part of a RACH procedure between the base station 105-*a* and the UE 115-*a* while the UE 115-*a* is in a connected mode, where the pre-compensation timing value may be based on the location of the UE 115-*a*. The UE 115-*a* may transmit the random access message 230 using a first random access resource of a set of random access resources associated with the pre-compensation timing value and the UE 115-*a*, and the base station 105-*a* may monitor a set of random access resources associated with the pre-compensation timing value and the UE 115-*a* for the random access message 230.

In some cases, the pre-compensation timing value may be determined by the base station 105-*a* (e.g., at the network side) and signaled to the UE 115-*a* via the communications link 220. In some examples, the base station 105-*a* may maintain a list of zones and a corresponding pre-compensation timing value for each of the zones. A zone may represent an area on the surface of the Earth (e.g., supported by the cells 205) or a volume in the sky covered by the base station 105-*a* (e.g., supported by the cell 210-*a*).

In some examples, the pre-compensation timing value for each zone may be the minimum value of the pre-compensation timing for a physical RACH (PRACH) preamble transmission. That is, each pre-compensation timing value may correspond to a minimum value for pre-compensation for a respective zone for a RACH preamble transmission (e.g., Msg1, MsgA). In some examples, the base station 105-*a* may maintain the zones and corresponding pre-compensation timing values by configuring logged measurements for one or more aerial UEs, including the UE 115-*a*. For example, the base station 105-*a* may maintain a list of the zones and the corresponding pre-compensation timing values based on one or more measurements associated with the one or more aerial UEs, where the measurements may correspond to the locations of the aerial UEs. As such, the base station 105-*a* may have prior information of the volume or coverage area the base station 105-*a* may support, which may be indicated by the zones. For each zone, the base station 105-*a* may have a pre-compensation timing factor that is logged, which the base station 105-*a* may continue to update based on periodic measurements from the aerial UEs.

The base station 105-*a* may indicate the pre-compensation timing value to the UE 115-*a* via one or more methods. In some examples, the base station 105-*a* may signal a UE-specific pre-compensation timing value to a respective UE 115 over dedicated RRC signaling. For example, during a handover procedure, the base station 105-*a* may signal the pre-compensation timing value in an RRC reconfiguration message (e.g., RRCReconfiguration). Additionally or alternatively, the base station 105-*a* may signal the pre-compensation timing value to the UE 115-*a* using a MAC control element (MAC-CE) or downlink control information (DCI).

In some examples, the pre-compensation timing value may be predefined (e.g., by the base station 105-*a*), and the base station 105-*a* may transmit an index corresponding to the pre-compensation timing value to the UE 115-*a* using RRC signaling, a MAC-CE, or DCI for transmission of the random access message 230 by the UE 115-*a*. That is, from the list of zones and corresponding pre-compensation timing values, the base station 105-*a* may indicate the index of one or more zones and corresponding pre-compensation timing values to the UE 115-*a*. In some cases, the index may be mapped to the pre-compensation timing value. Additionally or alternatively, the base station 105-*a* may broadcast a list including zone IDs of each zone and the corresponding pre-compensation timing values to one or more UEs 115 in a broadcast message (e.g., a system information block (SIB)). That is, the base station 105-*a* may broadcast signaling indicating multiple pre-compensation timing values to one or more aerial UEs, where the pre-compensation timing values may be associated with one or more zones supported by the base station 105-*a*. For example, one or more aerial UEs may be in the aerial coverage zone 215 and one or more aerial UEs may be in a different aerial coverage zone. Based on which aerial coverage zone an aerial UE is located in, the base station 105-*a* may indicate a different pre-compensation timing value. In some cases, the base station 105-*b* may activate one or more zone IDs by transmitting a bitmap to the UE 115-*b* via a MAC-CE or DCI or an indication via a dedicated RRC message.

The base station 105-*a* may obtain the location of the UE 115-*a* to compute the pre-compensation timing value. For example, the base station 105-*a* may configure the UE 115-*a*, while in the connected mode (e.g., RRC CONNECTED), to report location measurements (e.g., through MeasObj and ReportConfig) by means of dedicated signaling (e.g., RRCReconfiguration or RRCResume). The base station 105-*a* may configure the UE 115-*a* to send periodic location measurements to the base station 105-*a*. In some examples, the base station 105-*a* with multiple antennas may estimate the direction of the UE 115-*a* from the angle of arrival of uplink signals transmitted by the UE 115-*a*. The base station 105-*a* may estimate the distance from the latest timing advance used for the UE 115-*a* without using additional signaling. In some cases, the base station 105-*a* may obtain the location of the UE 115-*a* by querying a location server, which may include the use of new signaling in the LTE Positioning Protocol A (LPPa), the NR Positioning Protocol A (NRPPa), or both.

In some examples, the UE 115-*b* may estimate its own location and may use the location to compute the pre-compensation timing value. In some examples, the location of the base station 105-*a* may be signaled to the UE 115-*a*. For example, the base station 105-*a* may transmit signaling indicating a location of the base station 105-*a* via broadcast system information (e.g., SIB1) or via dedicated RRC signaling. The location of the base station 105-*a* may be the location of a same base station 105 if the UE 115-*a* may perform random access to the same cell. In some cases, during a handover procedure, the location of a target base station may be provided via an RRC reconfiguration message (e.g., RRCReconfiguration).

In some cases, the base station 105-*a* may transmit signaling configuring the UE 115-*a* with a pre-compensation timing value offset. The UE 115-*a* may use the pre-compensation timing value minus the offset to avoid overcompensation when determining the pre-compensation timing value. In some examples, the UE 115-*a* may be capable of measuring its own location, and may compute the pre-compensation timing value following Equation (1:

$$t_{pre} = 2\frac{\sqrt{(x_{gNB} - x_{UE})^2 + (y_{gNB} - y_{UE})^2 + (z_{gNB} - z_{UE})^2}}{c} \quad (1)$$

where ($x_{gNB}$, $y_{gNB}$, $z_{gNB}$) may represent the coordinates of the base station 105-*a*, ($x_{UE}$, $y_{UE}$, $z_{UE}$) may represent the coordinates of the UE 115-*a*, and c may represent the speed of light. That is, the UE 115-*a* may determine the pre-compensation timing value based on the location of the base station 105-*a* and the location of the UE 115-*a*.

In some examples, the UE 115-*a* may report the determined or used pre-compensation timing value to the base station 105-*a*. For example, the UE 115-*a* may transmit a report indicating the pre-compensation value determined or used by the UE 115-*a* based on the completion of the RACH procedure. In some cases, for contention-based or contention-free random access, the UE 115-*a* may report the pre-compensation timing value to the base station 105-*a* using a MAC-CE. For example, the MAC-CE may include 8 bits, where a 2-bit TAG ID may refer to a primary cell (Pcell) or a secondary cell (Scell) corresponding to the base station 105-*a*, and the preamble timing compensation may be encoded as a 6-bit message. The UE 115-*a* may transmit the MAC-CE to the base station 105-a upon completion of the RACH procedure. In some examples, the UE 115-a may refrain from reporting the pre-compensation timing value. The UE 115-a may continue to apply the pre-compensation timing value even when the base station 105-a indicates a timing advance after the RACH procedure. That is, the UE 115-a may keep the pre-compensation timing value to itself and may adjust the timing advance indicated by the base station 105-a with the pre-compensation timing value for uplink transmissions.

For pre-compensation signaled by the UE 115-a or the base station 105-a (e.g., for both UE-side and network-side pre-compensation), one or more UEs 115 (e.g., capable UEs) may be provided with two random access resources (e.g., two different RACHConfigGeneric per RACH attempt), where one random access resource may be configured with the pre-compensation timing value and one random access resource may be configured without the pre-compensation timing value (e.g., a fallback option). The random access resources may be provided in system information (e.g., broadcast to the one or more UEs 115) or via dedicated RRC signaling. If the pre-compensation timing value is available at the UE 115-b during a RACH attempt, the UE 115-b may attempt to use a first random access resource which may include the pre-compensation timing value. If the RACH attempt fails, the UE 115-b may use the second random access resource to perform random access without pre-compensation (e.g., the legacy state random access). For example, the UE 115-a may transmit the random access message 230 using the pre-compensation timing value via a second random access resource of the set of random access resources based on the pre-compensation timing value being available to the UE 115-a, and the UE 115-a may transmit the random access message 230 via a third random access resource of the set of random access resources based on the pre-compensation timing value being unavailable to the UE 115-a. In some examples, after monitoring the set of random access resources for the random access message 230, the base station 105-a may transmit a second message of the random access procedure indicating a timing pre-compensation of the random access message for the UE 115-a to use for communications with the base station 105-a.

In some examples, in the wireless communications system 200 (e.g., an NR wireless communications system), the UE 115-a may indicate whether the UE 115-a is capable of measuring its location (e.g., in x, y, and z-coordinates), whether the UE 115-a is capable of applying preamble-timing pre-compensation to Msg1 (e.g., MsgA), or both. In LTE wireless communications systems, the UE 115-a may indicate that the UE 115-a may be capable of measuring the height of the UE 115-a and the x and y coordinates of the UE 115-a.

Figure 3:
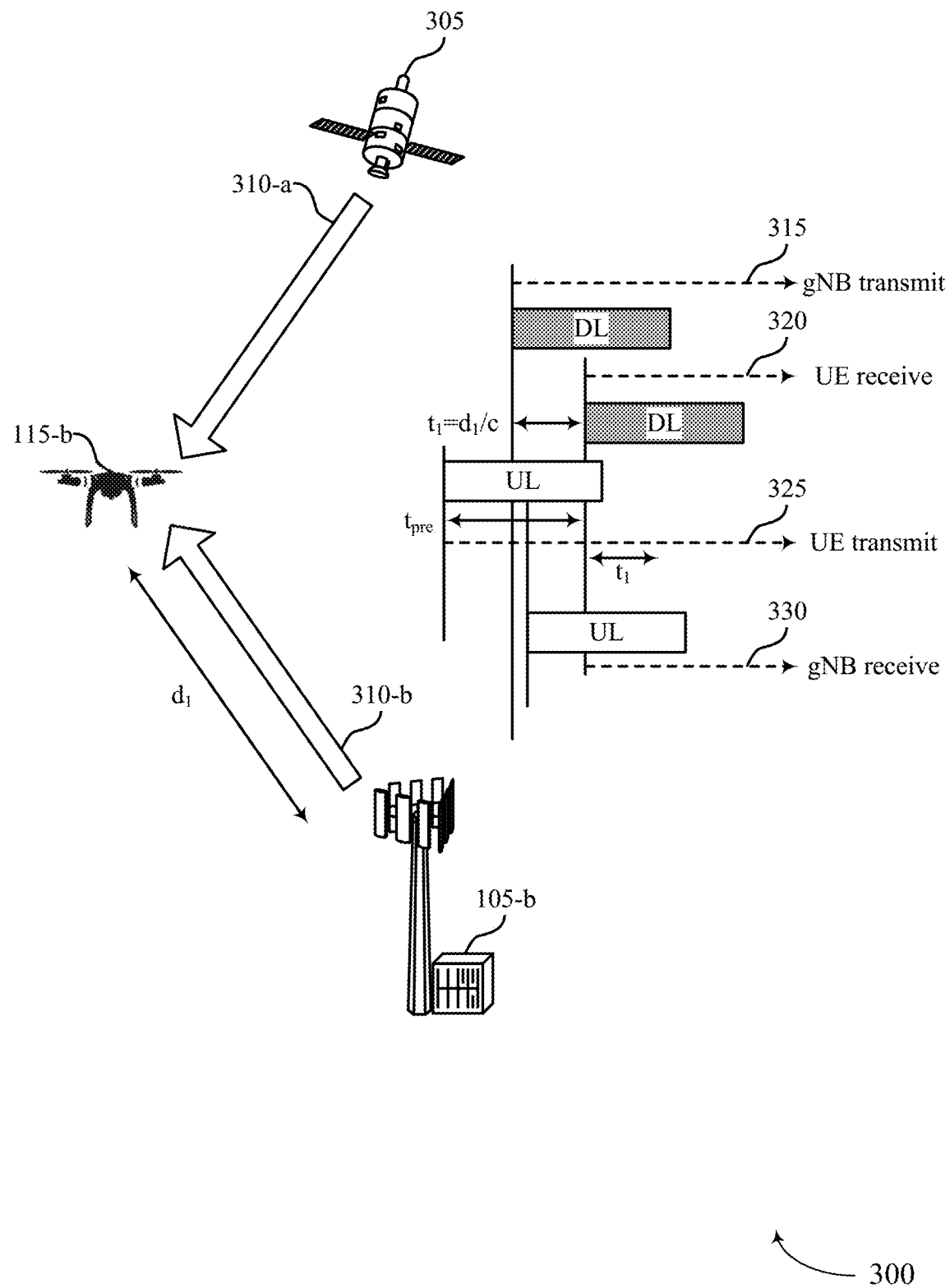
FIG. 3 illustrates an example of a wireless communications system that supports random access for aerial UEs in a connected mode in accordance with aspects of the present disclosure.

FIG. 3 illustrates an example of a wireless communications system 300 that supports random access for aerial UEs in a connected mode in accordance with aspects of the present disclosure. In some examples, the wireless communications system 300 may implement aspects of the wireless communications systems 100 and 200 or may be implemented by aspects of the wireless communications systems 100 and 200. For example, the wireless communications system 300 may include a base station 105-b and a UE 115-b, which may be examples of corresponding devices described herein.

The wireless communications system 300 may implement techniques for improved random access for aerial UEs in an RRC-connected mode. For example, the wireless communications system 300 may support a RACH procedure between the base station 105-b and the UE 115-b, where the UE 115-b may be an aerial UE. In some examples, the UE 115-b may communicate with a satellite 305 via a communications link 310-a and with the base station 105-b via a communications link 310-b, where the base station 105-b may be supported by a cell supporting aerial coverage. That is, the UE 115-b may be in an aerial coverage zone supported by the base station 105-b. In some examples, the UE 115-b may communicate with the satellite 305 for navigation purposes. For example, the UE 115-b may identify its location (e.g., x, y, and z-coordinates) based on the communications between the UE 115-b and the satellite 305.

To prevent the UE 115-b from transmitting a preamble for a RACH procedure (e.g., Msg1, MsgA) with a longer propagation delay (e.g., than a terrestrial UE), the base station 105-b may transmit an indication of a pre-compensation timing value (e.g., $t_{pre}$) for the UE 115-b to use for the transmission of a random access message. The random access message may be part of a RACH procedure between the base station 105-b and the UE 115-b while the UE 115-b is in a connected mode, where the pre-compensation timing value may be based on the location of the UE 115-b. The UE 115-b may transmit the random access message using a set of random access resources associated with the pre-compensation timing value and the UE 115-b, and the base station 105-b may monitor a set of random access resources associated with the pre-compensation timing value and the UE 115-b for the random access message.

Using the pre-compensation timing value, the UE 115-b may transmit a Msg1 (e.g., MsgA, a RACH preamble) to the base station 105-b at $t_{pre}$ time units earlier than the instant at which the Msg1 may have been previously transmitted. For example, at 315, the base station 105-b may transmit a timing reference via a downlink frame and at 320, the UE 115-b may receive the timing reference from the downlink frame. The downlink frame may take a time of $t_1$ to reach the UE 115-b, where $t_1 = d_1/c$, $d_1$ may represent the distance between the UE 115-b and the base station 105-b, and c may represent the speed of light. That is, due to the location of the UE 115-b, the downlink frame may be delayed by $t_1$.

The UE 115-b may align an uplink random access preamble transmission (e.g., Msg1) using the pre-compensation timing value such that the uplink random access preamble transmission may be scheduled $t_{pre}$ time units before the downlink frame timing. At 325, the UE 115-b may transmit the uplink random access preamble to the base station 105-b with a delay of $t_1$ (e.g., the propagation delay), and at 330, the base station 105-b may receive the uplink random access preamble. As such, the UE 115-b and the base station 105-b may experience a reduced total round-trip delay from $2t_1$ to $2t_1 - t_{pre}$ between the base station 105-b transmitting the timing reference and the base station 105-b receiving the random access preamble (e.g., the Msg1).

Figure 4:
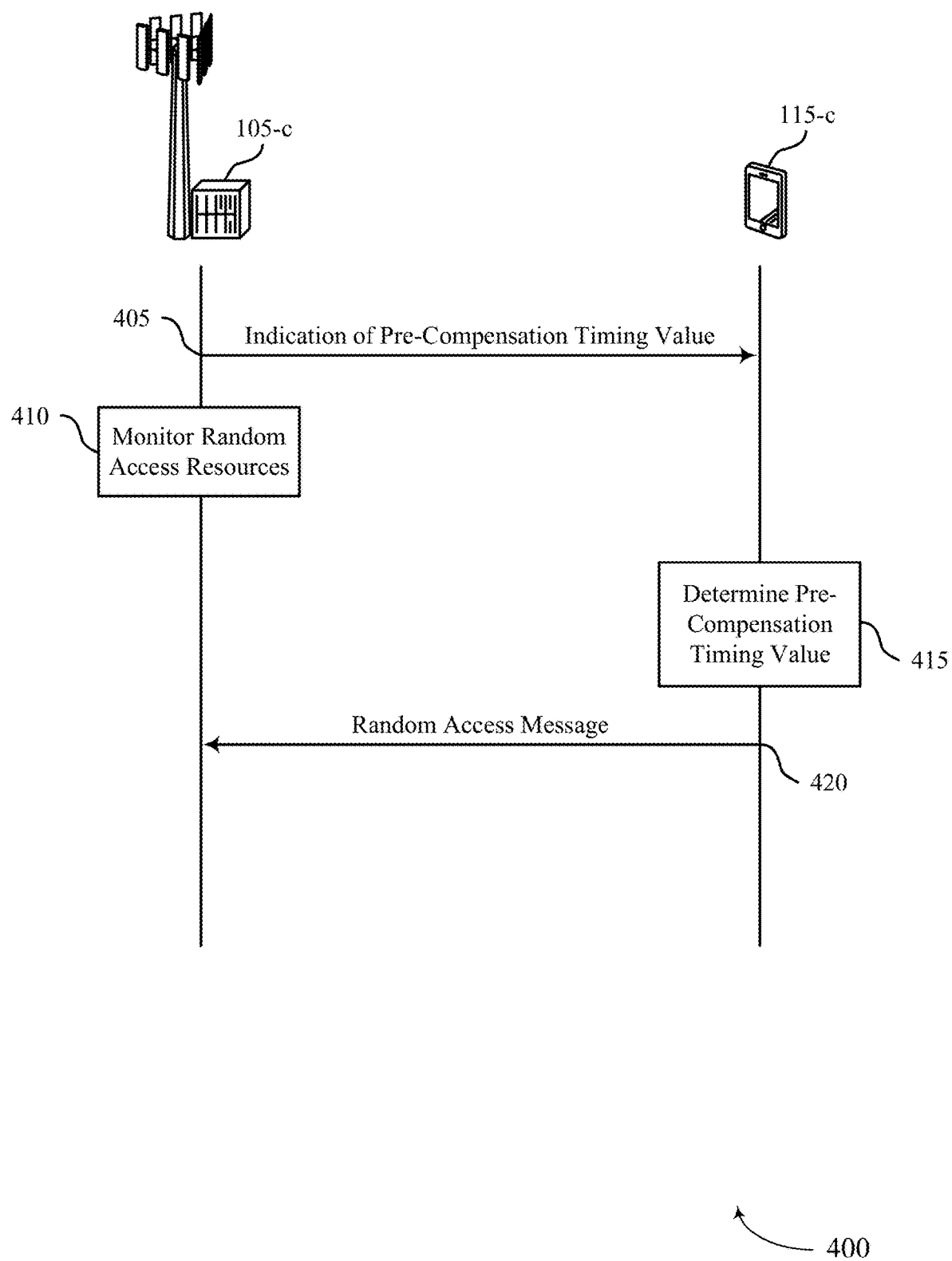
FIG. 4 illustrates an example of a process flow that supports random access for aerial UEs in a connected mode in accordance with aspects of the present disclosure.

FIG. 4 illustrates an example of a process flow 400 that supports random access for aerial UEs in a connected mode in accordance with aspects of the present disclosure. The process flow 400 may implement aspects of wireless communications systems 100 and 200, or may be implemented by aspects of the wireless communications system 100 and 200. For example, the process flow 400 may illustrate operations between a base station 105-c and a UE 115-c, which may be examples of corresponding devices described herein. In the following description of the process flow 400, the operations between the base station 105-c and the UE 115-c may be transmitted in a different order than the example order shown, or the operations performed by the base station 105-c and the UE 115-c may be performed in different orders or at different times. Some operations may also be omitted from the process flow 400, and other operations may be added to the process flow 400.

At 405, the base station 105-c may transmit an indication of a pre-compensation timing value (e.g., $t_{pre}$) for transmission of a random access message by the UE 115-c, which may be an aerial UE. The random access message may be part of a RACH procedure between the base station 105-c and the UE 115-c while the UE 115-c is in a connected mode (e.g., RRC CONNECTED), where the pre-compensation timing value may be based on the location of the UE 115-c. For example, the UE 115-c may be located in a zone (e.g., an aerial volume) supported by the base station 105-c, where the pre-compensation timing value may correspond to the zone.

At 410, the base station 105-c may monitor a set of random access resources for the random access message based on the indication, the set of random access resources associated with the pre-compensation timing value and the UE 115-c. In some examples, after monitoring the set of random access resources for the random access message, the base station 105-c may transmit a second message of the RACH procedure (e.g., Msg2) indicating a pre-compensation of the random access message for the UE 115-c to use for communication with the base station 105-c.

At 415, the UE 115-c may determine the pre-compensation timing value. In some cases, the UE 115-c may receive signaling indicating a location of the base station 105-c or signaling configuring the UE 115-c with a pre-compensation timing value offset. The UE 115-c may determine the pre-compensation timing value based on the location of the base station 105-c or the pre-compensation timing value offset. In some examples, the UE 115-c may determine the pre-compensation timing value based on the location of the base station 105-c and the location of the UE 115-c (e.g., the x, y, and z-coordinates).

At 420, the UE 115-c may transmit, to the base station 105-c and based on receiving the indication of the pre-compensation timing value, the random access message using a first random access resource of a set of random access resources associated with the pre-compensation timing value and the UE 115-c. In some examples, by transmitting the random access message using the pre-compensation timing value, the UE 115-c may reduce the total round-trip delay in transmitting the random access message to the base station 105-c.

Figure 5:
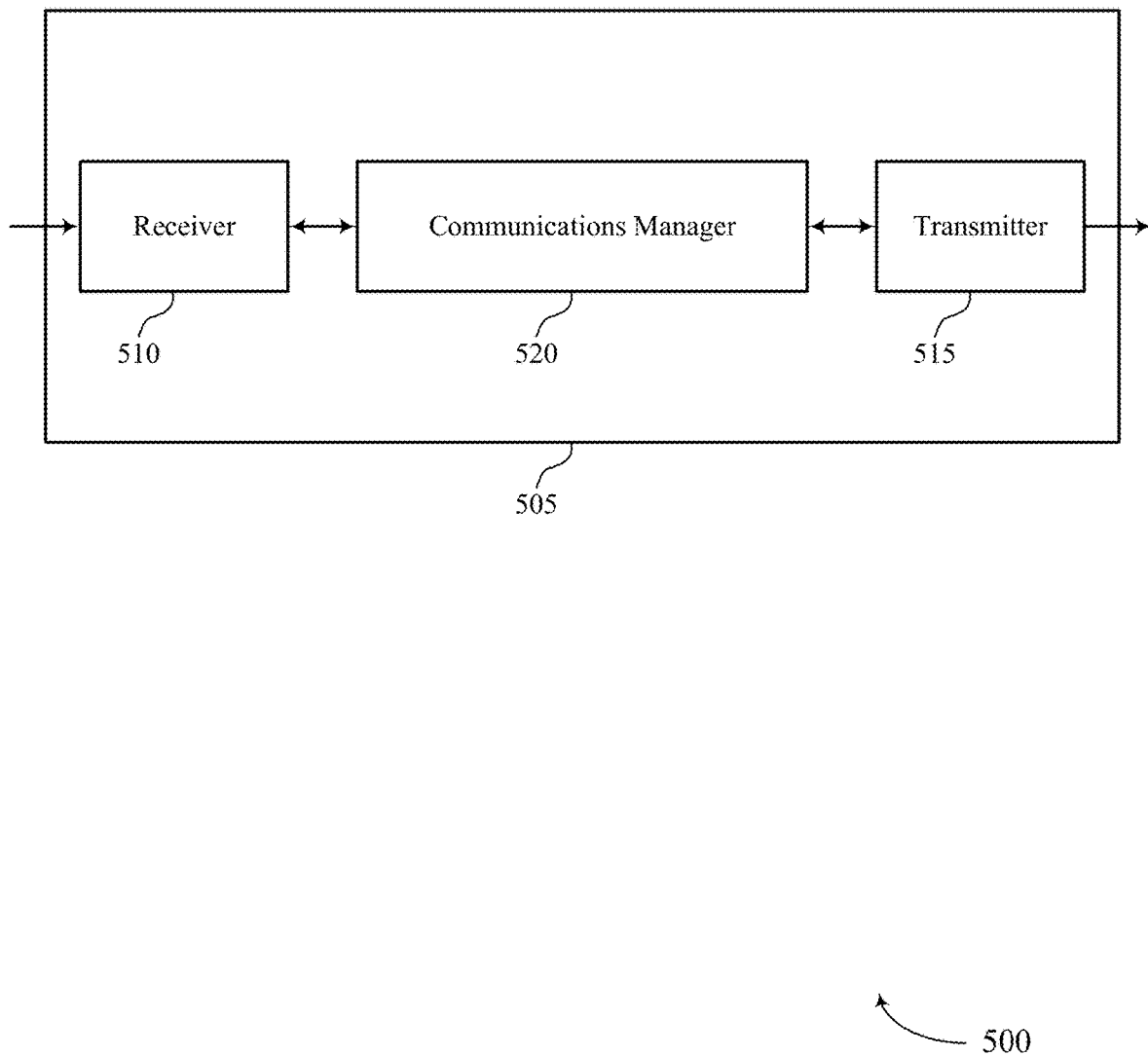
FIGS. 5 and 6 show block diagrams of devices that support random access for aerial UEs in a connected mode in accordance with aspects of the present disclosure.

FIG. 5 shows a block diagram 500 of a device 505 that supports random access for aerial UEs in a connected mode in accordance with aspects of the present disclosure. The device 505 may be an example of aspects of a base station 105 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to random access for aerial UEs in a connected mode). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to random access for aerial UEs in a connected mode). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of random access for aerial UEs in a connected mode as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), an application-specific integrated circuit (ASIC), a field programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 520 may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communications at a base station in accordance with examples as disclosed herein. For example, the communications manager 520 may be configured as or otherwise support a means for transmitting an indication of a pre-compensation timing value for transmission of a random access message by an aerial UE, the random access message being part of a random access procedure between the base station and the aerial UE, where the pre-compensation timing value is based on a location of the aerial UE. The communications manager 520 may be configured as or otherwise support a means for monitoring a set of random access resources for the random access message based on the indication, the set of random access resources associated with the pre-compensation timing value and the aerial UE.

By including or configuring the communications manager 520 in accordance with examples as described herein, the device 505 (e.g., a processor controlling or otherwise coupled to the receiver 510, the transmitter 515, the communications manager 520, or a combination thereof) may support techniques for improved RACH procedures for aerial UEs in a connected state. For example, in some cases, the described techniques may enable the UE to transmit a random access message associated with a RACH procedure with a reduced propagation delay, which may reduce latency and improve user experience.

Figure 6:
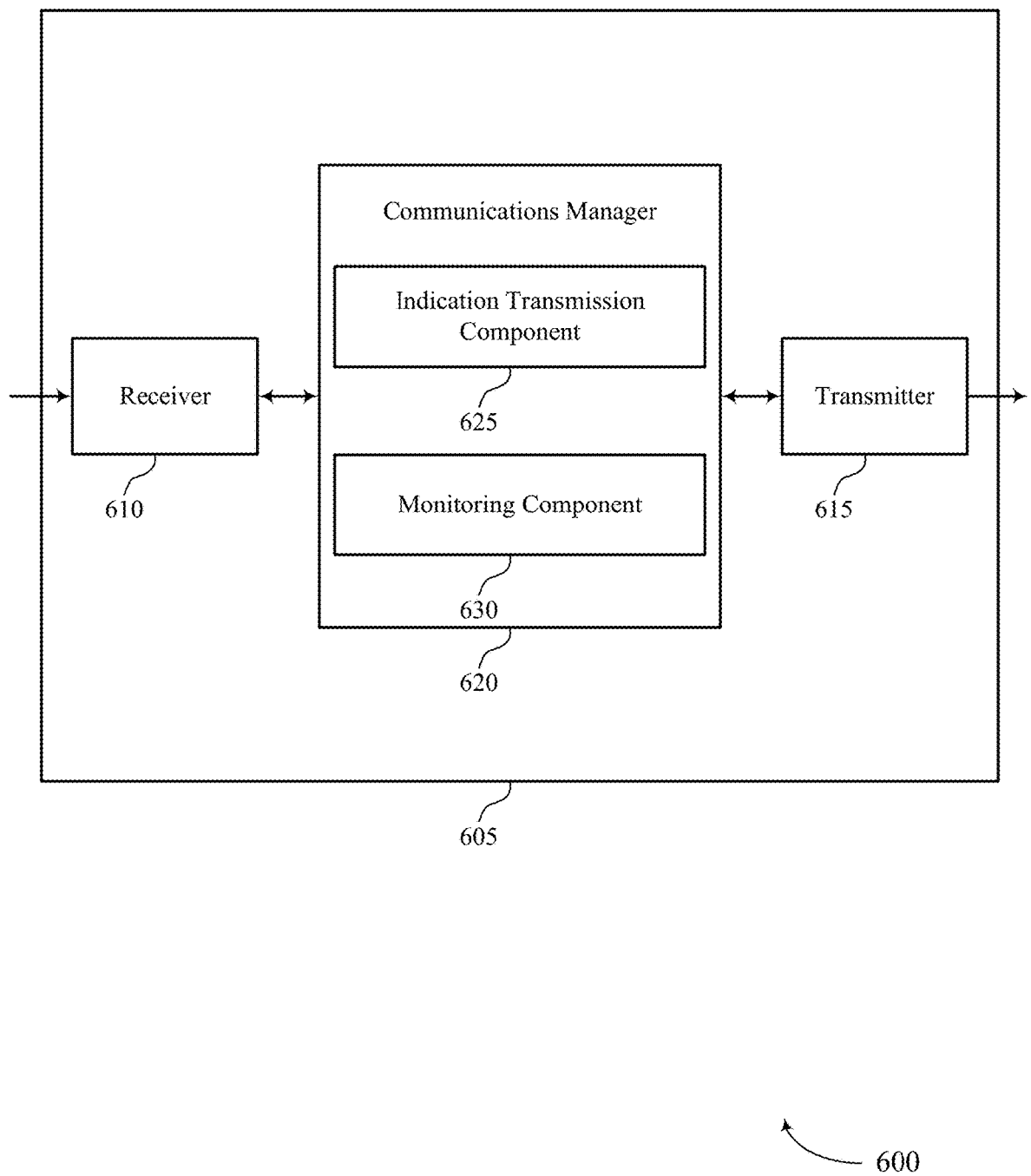

FIG. 6 shows a block diagram 600 of a device 605 that supports random access for aerial UEs in a connected mode in accordance with aspects of the present disclosure. The device 605 may be an example of aspects of a device 505 or a base station 105 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to random access for aerial UEs in a connected mode). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to random access for aerial UEs in a connected mode). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of random access for aerial UEs in a connected mode as described herein. For example, the communications manager 620 may include an indication transmission component 625 a monitoring component 630, or any combination thereof. The communications manager 620 may be an example of aspects of a communications manager 520 as described herein. In some examples, the communications manager 620, or various components thereof, may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communications at a base station in accordance with examples as disclosed herein. The indication transmission component 625 may be configured as or otherwise support a means for transmitting an indication of a pre-compensation timing value for transmission of a random access message by an aerial UE, the random access message being part of a random access procedure between the base station and the aerial UE, where the pre-compensation timing value is based on a location of the aerial UE. The monitoring component 630 may be configured as or otherwise support a means for monitoring a set of random access resources for the random access message based on the indication, the set of random access resources associated with the pre-compensation timing value and the aerial UE.

Figure 7:
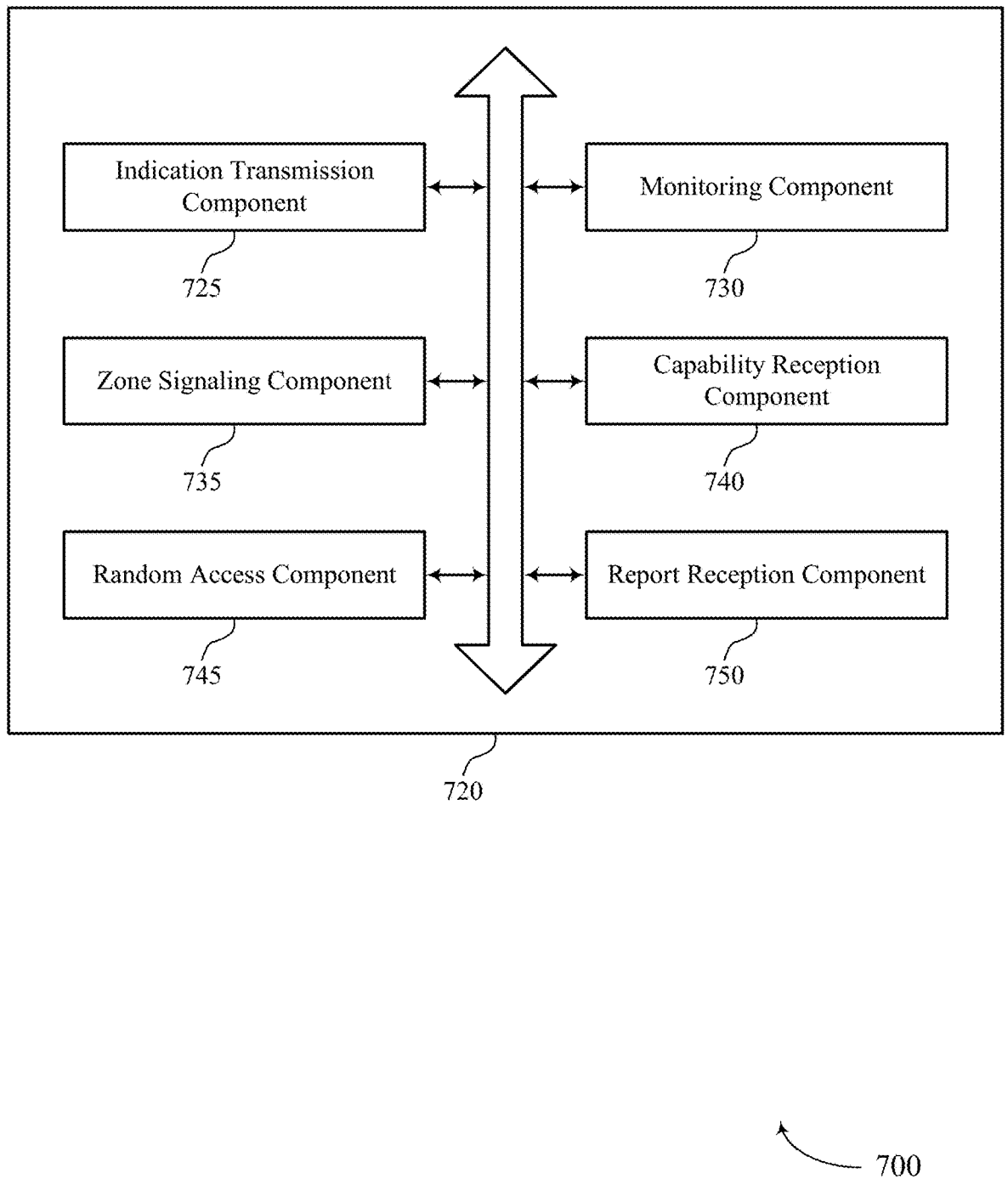
FIG. 7 shows a block diagram of a communications manager that supports random access for aerial UEs in a connected mode in accordance with aspects of the present disclosure.

FIG. 7 shows a block diagram 700 of a communications manager 720 that supports random access for aerial UEs in a connected mode in accordance with aspects of the present disclosure. The communications manager 720 may be an example of aspects of a communications manager 520, a communications manager 620, or both, as described herein. The communications manager 720, or various components thereof, may be an example of means for performing various aspects of random access for aerial UEs in a connected mode as described herein. For example, the communications manager 720 may include an indication transmission component 725, a monitoring component 730, a zone signaling component 735, a capability reception component 740, a random access component 745, a report reception component 750, or any combination thereof. Each of these components may communicate, directly or indirectly, with one another (e.g., via one or more buses).

The communications manager 720 may support wireless communications at a base station in accordance with examples as disclosed herein. The indication transmission component 725 may be configured as or otherwise support a means for transmitting an indication of a pre-compensation timing value for transmission of a random access message by an aerial UE, the random access message being part of a random access procedure between the base station and the aerial UE, where the pre-compensation timing value is based on a location of the aerial UE. The monitoring component 730 may be configured as or otherwise support a means for monitoring a set of random access resources for the random access message based on the indication, the set of random access resources associated with the pre-compensation timing value and the aerial UE.

In some examples, to support transmitting the indication of the pre-compensation timing value, the indication transmission component 725 may be configured as or otherwise support a means for transmitting the indication of the pre-compensation timing value for transmission of the random access message by the aerial UE, the random access message being part of the random access procedure between the base station and the aerial UE when the aerial UE is in a connected state.

In some examples, to support transmitting the indication of the pre-compensation timing value, the indication transmission component 725 may be configured as or otherwise support a means for transmitting, to the aerial UE, the indication of the pre-compensation timing value via RRC signaling, a MAC-CE, or DCI, where the pre-compensation timing value is specific to the aerial UE.

In some examples, to support transmitting the indication of the pre-compensation timing value, the indication transmission component 725 may be configured as or otherwise support a means for transmitting an index corresponding to the pre-compensation timing value for transmission of the random access message by the aerial UE.

In some examples, to support transmitting the indication of the pre-compensation timing value, the zone signaling component 735 may be configured as or otherwise support a means for transmitting broadcast signaling indicating a set of multiple zones and corresponding zone identifiers, where each zone of the set of multiple zones is associated with a respective pre-compensation timing value for transmission of the random access message by the aerial UE.

In some examples, the zone signaling component 735 may be configured as or otherwise support a means for transmitting, to the aerial UE and via a dedicated RRC message, an indication to activate a zone identifier for the aerial UE.

In some examples, the zone signaling component 735 may be configured as or otherwise support a means for transmitting, to the aerial UE and via a MAC-CE or DCI, a bitmap to activate a zone identifier for the aerial UE.

In some examples, the zone signaling component 735 may be configured as or otherwise support a means for maintaining a list including the set of multiple zones and the respective pre-compensation timing values based on one or more measurements associated with one or more aerial UEs. In some examples, each pre-compensation timing value corresponds to a minimum value for pre-compensation for a respective zone for a random access preamble transmission.

In some examples, the capability reception component 740 may be configured as or otherwise support a means for receiving a capability message from the aerial UE, the capability message indicating a capability of the aerial UE to measure the location of the aerial UE, to apply a pre-compensation timing value, or both.

In some examples, the random access component 745 may be configured as or otherwise support a means for transmitting a second message of the random access procedure after monitoring the set of random access resources for the random access message, the second message indicating a timing pre-compensation of the random access message.

In some examples, to support transmitting the indication of the pre-compensation timing value, the indication transmission component 725 may be configured as or otherwise support a means for transmitting signaling indicating a location of the base station via system information or dedicated RRC signaling.

In some examples, to support transmitting the indication of the pre-compensation timing value, the indication transmission component 725 may be configured as or otherwise support a means for transmitting signaling configuring the aerial UE with a pre-compensation timing value offset.

In some examples, the report reception component 750 may be configured as or otherwise support a means for receiving, based on completion of the random access procedure, a report indicating the pre-compensation timing value determined or used by the aerial UE.

Figure 8:
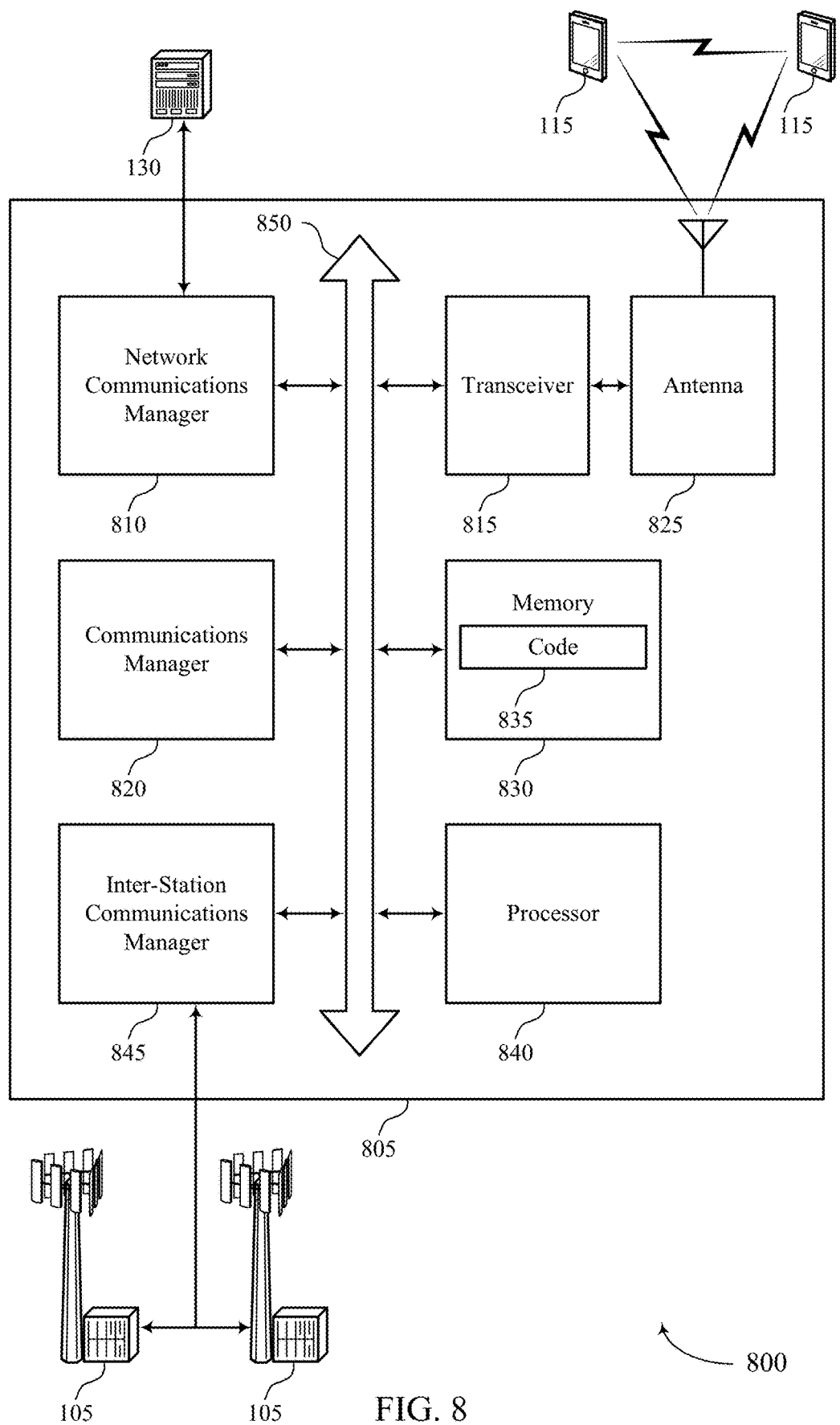
FIG. 8 shows a diagram of a system including a device that supports random access for aerial UEs in a connected mode in accordance with aspects of the present disclosure.

FIG. 8 shows a diagram of a system 800 including a device 805 that supports random access for aerial UEs in a connected mode in accordance with aspects of the present disclosure. The device 805 may be an example of or include the components of a device 505, a device 605, or a base station 105 as described herein. The device 805 may communicate wirelessly with one or more base stations 105, UEs 115, or any combination thereof. The device 805 may include components for bi-directional voice and data communications including components for transmitting and receiving communications, such as a communications manager 820, a network communications manager 810, a transceiver 815, an antenna 825, a memory 830, code 835, a processor 840, and an inter-station communications manager 845. These components may be in electronic communication or otherwise coupled (e.g., operatively, communicatively, functionally, electronically, electrically) via one or more buses (e.g., a bus 850).

The network communications manager 810 may manage communications with a core network 130 (e.g., via one or more wired backhaul links). For example, the network communications manager 810 may manage the transfer of data communications for client devices, such as one or more UEs 115.

In some cases, the device 805 may include a single antenna 825. However, in some other cases the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting random access for aerial UEs in a connected mode). For example, the device 805 or a component of the device 805 may include a processor 840 and memory 830 coupled to the processor 840, the processor 840 and memory 830 configured to perform various functions described herein.

The inter-station communications manager 845 may manage communications with other base stations 105, and may include a controller or scheduler for controlling communications with UEs 115 in cooperation with other base stations 105. For example, the inter-station communications manager 845 may coordinate scheduling for transmissions to UEs 115 for various interference mitigation techniques such as beamforming or joint transmission. In some examples, the inter-station communications manager 845 may provide an X2 interface within an LTE/LTE-A wireless communications network technology to provide communication between base stations 105.

The communications manager 820 may support wireless communications at a base station in accordance with examples as disclosed herein. For example, the communications manager 820 may be configured as or otherwise support a means for transmitting an indication of a pre-compensation timing value for transmission of a random access message by an aerial UE, the random access message being part of a random access procedure between the base station and the aerial UE, where the pre-compensation timing value is based on a location of the aerial UE. The communications manager 820 may be configured as or otherwise support a means for monitoring a set of random access resources for the random access message based on the indication, the set of random access resources associated with the pre-compensation timing value and the aerial UE.

By including or configuring the communications manager 820 in accordance with examples as described herein, the device 805 may support techniques for improved RACH procedures for aerial UEs in a connected state. For example, in some cases, the described techniques may enable the UE to transmit a random access message associated with a RACH procedure with a reduced propagation delay, which may reduce latency and improve user experience.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of random access for aerial UEs in a connected mode as described herein, or the processor 840 and the memory 830 may be otherwise configured to perform or support such operations.

Figure 9:
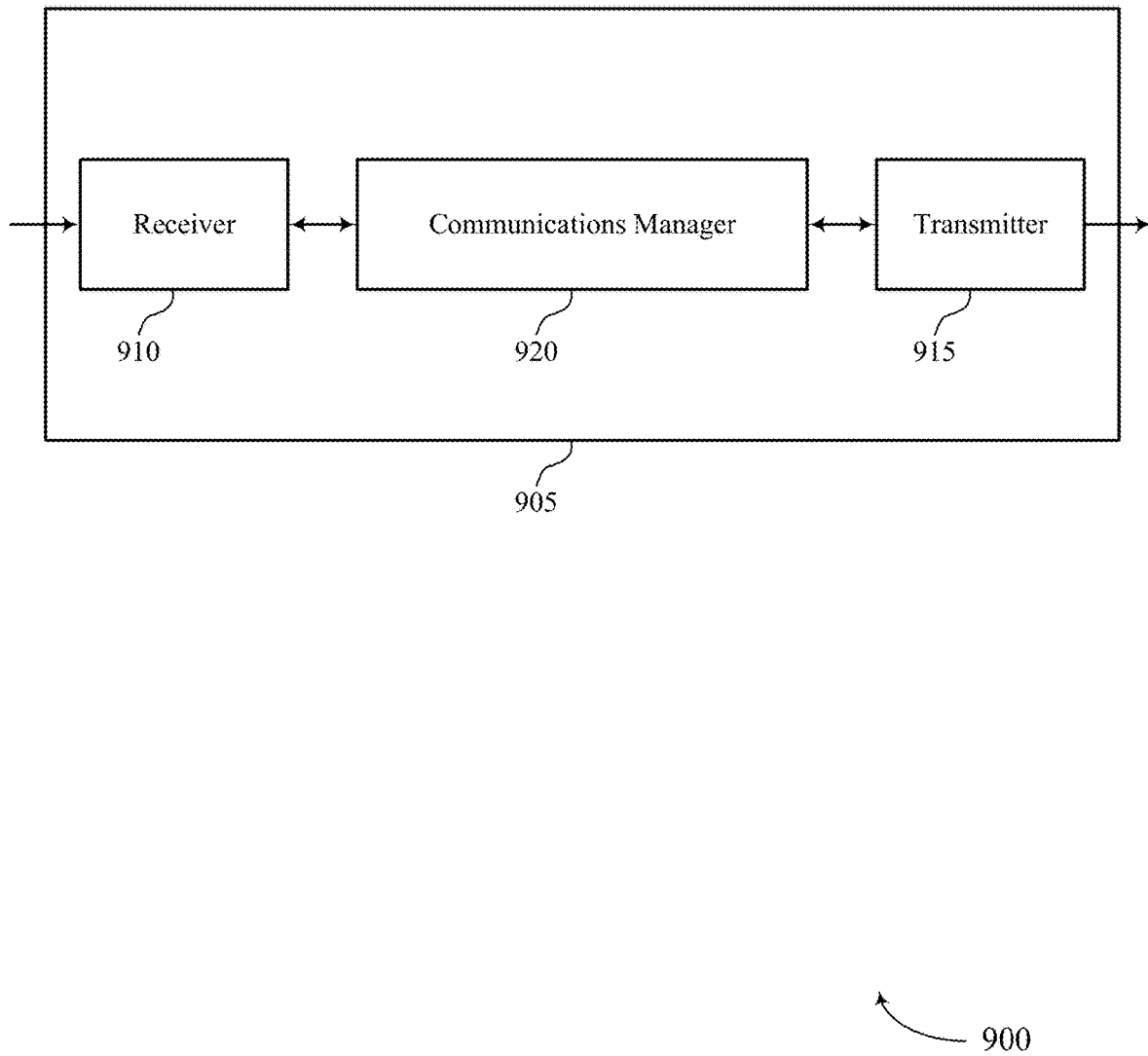
FIGS. 9 and 10 show block diagrams of devices that support random access for aerial UEs in a connected mode in accordance with aspects of the present disclosure.

FIG. 9 shows a block diagram 900 of a device 905 that supports random access for aerial UEs in a connected mode in accordance with aspects of the present disclosure. The device 905 may be an example of aspects of a UE 115 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to random access for aerial UEs in a connected mode). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to random access for aerial UEs in a connected mode). In some examples, the transmitter 915 may be co-located with a receiver 910 in a transceiver module. The transmitter 915 may utilize a single antenna or a set of multiple antennas.

The communications manager 920, the receiver 910, the transmitter 915, or various combinations thereof or various components thereof may be examples of means for performing various aspects of random access for aerial UEs in a connected mode as described herein. For example, the communications manager 920, the receiver 910, the transmitter 915, or various combinations or components thereof may support a method for performing one or more of the functions described herein.

In some examples, the communications manager 920, the receiver 910, the transmitter 915, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 920, the receiver 910, the transmitter 915, or various combinations or components thereof may be implemented in code (e.g., as communications management software or firmware) executed by a processor. If implemented in code executed by a processor, the functions of the communications manager 920, the receiver 910, the transmitter 915, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 920 may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communications at an aerial UE in accordance with examples as disclosed herein. For example, the communications manager 920 may be configured as or otherwise support a means for receiving an indication of a pre-compensation timing value for transmission of a random access message by the aerial UE, the random access message being part of a random access procedure between a base station and the aerial UE, where the pre-compensation timing value is based on a location of the aerial UE. The communications manager 920 may be configured as or otherwise support a means for transmitting, based on receiving the indication, the random access message using a first random access resource of a set of random access resources associated with the pre-compensation timing value and the aerial UE.

By including or configuring the communications manager 920 in accordance with examples as described herein, the device 905 (e.g., a processor controlling or otherwise coupled to the receiver 910, the transmitter 915, the communications manager 920, or a combination thereof) may support techniques for improved RACH procedures for aerial UEs in a connected state. For example, in some cases, the described techniques may enable the UE to transmit a random access message associated with a RACH procedure with a reduced propagation delay, which may reduce latency and improve user experience.

Figure 10:
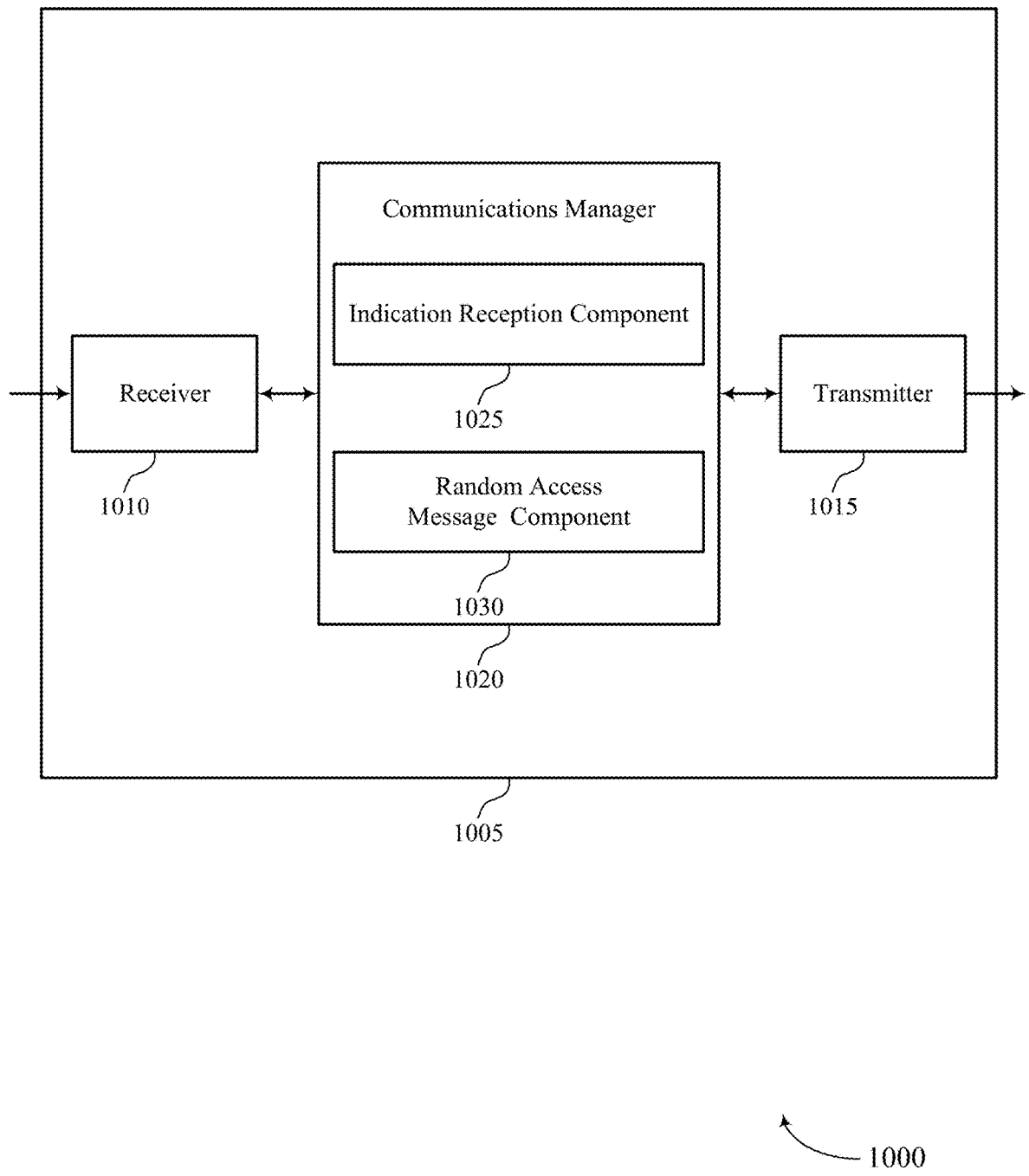

FIG. 10 shows a block diagram 1000 of a device 1005 that supports random access for aerial UEs in a connected mode in accordance with aspects of the present disclosure. The device 1005 may be an example of aspects of a device 905 or a UE 115 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to random access for aerial UEs in a connected mode). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to random access for UEs in a connected mode). In some examples, the transmitter 1015 may be co-located with a receiver 1010 in a transceiver module. The transmitter 1015 may utilize a single antenna or a set of multiple antennas.

The device 1005, or various components thereof, may be an example of means for performing various aspects of random access for aerial UEs in a connected mode as described herein. For example, the communications manager 1020 may include an indication reception component 1025 a random access message component 1030, or any combination thereof. The communications manager 1020 may be an example of aspects of a communications manager 920 as described herein. In some examples, the communications manager 1020, or various components thereof, may be configured to perform various operations (e.g., receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

The communications manager 1020 may support wireless communications at an aerial UE in accordance with examples as disclosed herein. The indication reception component 1025 may be configured as or otherwise support a means for receiving an indication of a pre-compensation timing value for transmission of a random access message by the aerial UE, the random access message being part of a random access procedure between a base station and the aerial UE, where the pre-compensation timing value is based on a location of the aerial UE. The random access message component 1030 may be configured as or otherwise support a means for transmitting, based on receiving the indication, the random access message using a first random access resource of a set of random access resources associated with the pre-compensation timing value and the aerial UE.

Figure 11:
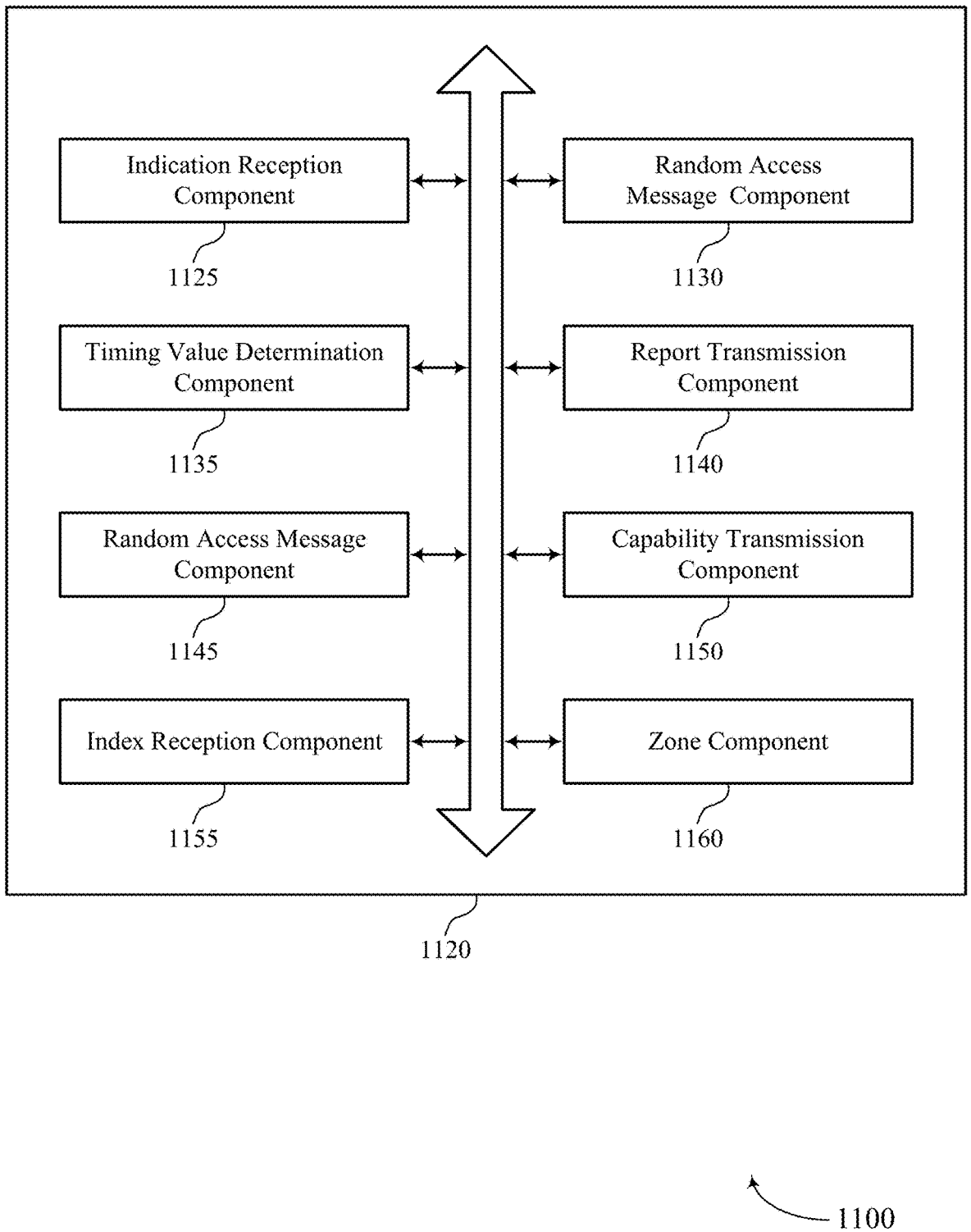
FIG. 11 shows a block diagram of a communications manager that supports random access for aerial UEs in a connected mode in accordance with aspects of the present disclosure.

FIG. 11 shows a block diagram 1100 of a communications manager 1120 that supports random access for aerial UEs in a connected mode in accordance with aspects of the present disclosure. The communications manager 1120 may be an example of aspects of a communications manager 920, a communications manager 1020, or both, as described herein. The communications manager 1120, or various components thereof, may be an example of means for performing various aspects of random access for aerial UEs in a connected mode as described herein. For example, the communications manager 1120 may include an indication reception component 1125, a random access message component 1130, a timing value determination component 1135, a report transmission component 1140, a random access message component 1145, a capability transmission component 1150, an index reception component 1155, a zone component 1160, or any combination thereof. Each of these components may communicate, directly or indirectly, with one another (e.g., via one or more buses).

The communications manager 1120 may support wireless communications at an aerial UE in accordance with examples as disclosed herein. The indication reception component 1125 may be configured as or otherwise support a means for receiving an indication of a pre-compensation timing value for transmission of a random access message by the aerial UE, the random access message being part of a random access procedure between a base station and the aerial UE, where the pre-compensation timing value is based on a location of the aerial UE. The random access message component 1130 may be configured as or otherwise support a means for transmitting, based on receiving the indication, the random access message using a first random access resource of a set of random access resources associated with the pre-compensation timing value and the aerial UE.

In some examples, to support receiving the indication of the pre-compensation timing value, the indication reception component 1125 may be configured as or otherwise support a means for receiving the indication of the pre-compensation timing value for transmission of the random access message by the aerial UE, the random access message being part of the random access procedure between the base station and the aerial UE when the aerial UE is in a connected state.

In some examples, to support receiving the indication of the pre-compensation timing value, the indication reception component 1125 may be configured as or otherwise support a means for receiving signaling indicating a location of the base station via system information or dedicated RRC signaling. In some examples, to support receiving the indication of the pre-compensation timing value, the timing value determination component 1135 may be configured as or otherwise support a means for determining the pre-compensation timing value based on the location of the base station.

In some examples, to support receiving the indication of the pre-compensation timing value, the indication reception component 1125 may be configured as or otherwise support a means for receiving signaling configuring the aerial UE with a pre-compensation timing value offset. In some examples, to support receiving the indication of the pre-compensation timing value, the timing value determination component 1135 may be configured as or otherwise support a means for determining the pre-compensation timing value based on the pre-compensation timing value offset.

In some examples, the timing value determination component 1135 may be configured as or otherwise support a means for determining the pre-compensation timing value based on the location of the base station and the location of the aerial UE.

In some examples, the report transmission component 1140 may be configured as or otherwise support a means for transmitting, based on completion of the random access procedure, a report indicating the pre-compensation timing value determined by the aerial UE.

In some examples, the random access message component 1145 may be configured as or otherwise support a means for transmitting the random access message using the pre-compensation timing value via a second random access resource of the set of random access resources based on the pre-compensation timing value being available at the aerial UE. In some examples, the random access message component 1145 may be configured as or otherwise support a means for transmitting the random access message via a third random access resource of the set of random access resources based on the pre-compensation timing value being unavailable at the aerial UE.

In some examples, the capability transmission component 1150 may be configured as or otherwise support a means for transmitting a capability message from the aerial UE, the capability message indicating a capability of the aerial UE to measure the location of the aerial UE, to apply a pre-compensation timing value, or both.

In some examples, to support receiving the indication of the pre-compensation timing value, the indication reception component 1125 may be configured as or otherwise support a means for receiving, from the base station, the indication of the pre-compensation timing value via RRC signaling, a MAC-CE, or DCI, where the pre-compensation timing value is specific to the aerial UE.

In some examples, to support receiving the indication of the pre-compensation timing value, the index reception component 1155 may be configured as or otherwise support a means for receiving an index corresponding to the pre-compensation timing value for transmission of the random access message by the aerial UE.

In some examples, to support receiving the indication of the pre-compensation timing value, the zone component 1160 may be configured as or otherwise support a means for receiving broadcast signaling indicating a set of multiple zones and corresponding zone identifiers, where each zone of the set of multiple zones is associated with a respective pre-compensation timing value for transmission of the random access message by the aerial UE.

In some examples, the zone component 1160 may be configured as or otherwise support a means for receiving, from the base station and via a dedicated RRC message, an indication to activate a zone identifier for the aerial UE.

In some examples, the zone component 1160 may be configured as or otherwise support a means for receiving, from the base station and via a MAC-CE or DCI, a bitmap to activate a zone identifier for the aerial UE. In some examples, each pre-compensation timing value corresponds to a minimum value for pre-compensation for a respective zone for a random access preamble transmission.

In some examples, the random access message component 1145 may be configured as or otherwise support a means for receiving a second message of the random access procedure after transmitting the random access message, the second message indicating a timing pre-compensation of the random access message.

Figure 12:
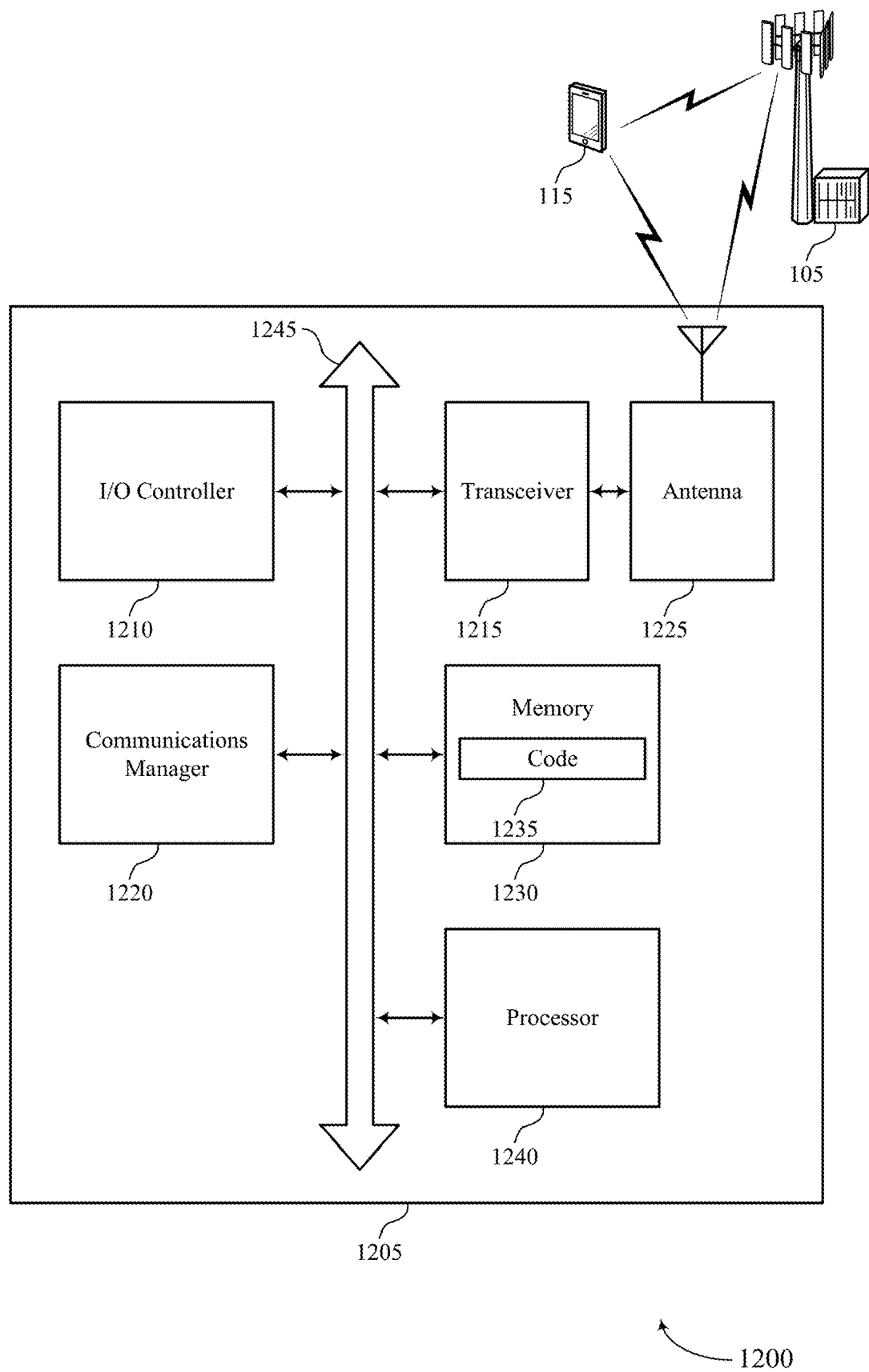
FIG. 12 shows a diagram of a system including a device that supports random access for aerial UEs in a connected mode in accordance with aspects of the present disclosure.

FIG. 12 shows a diagram of a system 1200 including a device 1205 that supports random access for aerial UEs in a connected mode in accordance with aspects of the present disclosure. The device 1205 may be an example of or include the components of a device 905, a device 1005, or a UE 115 as described herein. The device 1205 may communicate wirelessly with one or more base stations 105, UEs 115, or any combination thereof. The device 1205 may include components for bi-directional voice and data communications including components for transmitting and receiving communications, such as a communications manager 1220, an input/output (I/O) controller 1210, a transceiver 1215, an antenna 1225, a memory 1230, code 1235, and a processor 1240. These components may be in electronic communication or otherwise coupled (e.g., operatively, communicatively, functionally, electronically, electrically) via one or more buses (e.g., a bus 1245).

The I/O controller 1210 may manage input and output signals for the device 1205. The I/O controller 1210 may also manage peripherals not integrated into the device 1205. In some cases, the I/O controller 1210 may represent a physical connection or port to an external peripheral. In some cases, the I/O controller 1210 may utilize an operating system such as iOS®, ANDROID®, MS-DOS®, MS-WINDOWS®, OS/2®, UNIX®, LINUX®, or another known operating system. Additionally or alternatively, the I/O controller 1210 may represent or interact with a modem, a keyboard, a mouse, a touchscreen, or a similar device. In some cases, the I/O controller 1210 may be implemented as part of a processor, such as the processor 1240. In some cases, a user may interact with the device 1205 via the I/O controller 1210 or via hardware components controlled by the I/O controller 1210.

In some cases, the device 1205 may include a single antenna 1225. However, in some other cases, the device 1205 may have more than one antenna 1225, which may be capable of concurrently transmitting or receiving multiple wireless transmissions. The transceiver 1215 may communicate bi-directionally, via the one or more antennas 1225, wired, or wireless links as described herein. For example, the transceiver 1215 may represent a wireless transceiver and may communicate bi-directionally with another wireless transceiver. The transceiver 1215 may also include a modem to modulate the packets, to provide the modulated packets to one or more antennas 1225 for transmission, and to demodulate packets received from the one or more antennas 1225. The transceiver 1215, or the transceiver 1215 and one or more antennas 1225, may be an example of a transmitter 915, a transmitter 1015, a receiver 910, a receiver 1010, or any combination thereof or component thereof, as described herein.

The memory 1230 may include RAM and ROM. The memory 1230 may store computer-readable, computer-executable code 1235 including instructions that, when executed by the processor 1240, cause the device 1205 to perform various functions described herein. The code 1235 may be stored in a non-transitory computer-readable medium such as system memory or another type of memory. In some cases, the code 1235 may not be directly executable by the processor 1240 but may cause a computer (e.g., when compiled and executed) to perform functions described herein. In some cases, the memory 1230 may contain, among other things, a BIOS which may control basic hardware or software operation such as the interaction with peripheral components or devices.

The processor 1240 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting random access for aerial UEs in a connected mode). For example, the device 1205 or a component of the device 1205 may include a processor 1240 and memory 1230 coupled to the processor 1240, the processor 1240 and memory 1230 configured to perform various functions described herein.

The communications manager 1220 may support wireless communications at an aerial UE in accordance with examples as disclosed herein. For example, the communications manager 1220 may be configured as or otherwise support a means for receiving an indication of a pre-compensation timing value for transmission of a random access message by the aerial UE, the random access message being part of a random access procedure between a base station and the aerial UE, where the pre-compensation timing value is based on a location of the aerial UE. The communications manager 1220 may be configured as or otherwise support a means for transmitting, based on receiving the indication, the random access message using a first random access resource of a set of random access resources associated with the pre-compensation timing value and the aerial UE.

By including or configuring the communications manager 1220 in accordance with examples as described herein, the device 1205 may support techniques for improved RACH procedures for aerial UEs in a connected state. For example, in some cases, the described techniques may enable the UE to transmit a random access message associated with a RACH procedure with a reduced propagation delay, which may reduce latency and improve user experience.

In some examples, the communications manager 1220 may be configured to perform various operations (e.g., receiving, monitoring, transmitting) using or otherwise in cooperation with the transceiver 1215, the one or more antennas 1225, or any combination thereof. Although the communications manager 1220 is illustrated as a separate component, in some examples, one or more functions described with reference to the communications manager 1220 may be supported by or performed by the processor 1240, the memory 1230, the code 1235, or any combination thereof. For example, the code 1235 may include instructions executable by the processor 1240 to cause the device 1205 to perform various aspects of random access for aerial UEs in a connected mode as described herein, or the processor 1240 and the memory 1230 may be otherwise configured to perform or support such operations.

Figure 13:
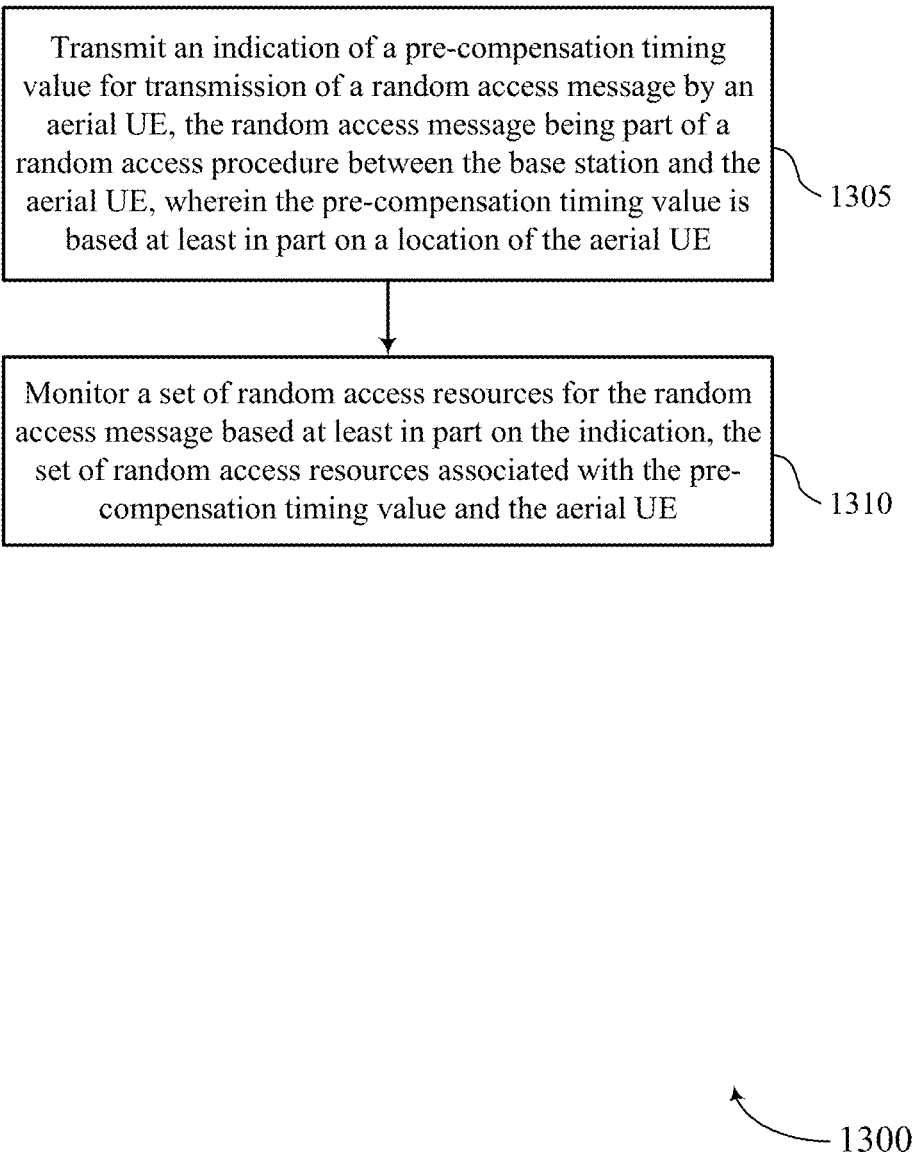
FIGS. 13 through 17 show flowcharts illustrating methods that support random access for aerial UEs in a connected mode in accordance with aspects of the present disclosure.

FIG. 13 shows a flowchart illustrating a method 1300 that supports random access for aerial UEs in a connected mode in accordance with aspects of the present disclosure. The operations of the method 1300 may be implemented by a base station or its components as described herein. For example, the operations of the method 1300 may be performed by a base station 105 as described with reference to FIGS. 1 through 8. In some examples, a base station may execute a set of instructions to control the functional elements of the base station to perform the described functions. Additionally or alternatively, the base station may perform aspects of the described functions using special-purpose hardware.

At 1305, the method may include transmitting an indication of a pre-compensation timing value for transmission of a random access message by an aerial UE, the random access message being part of a random access procedure between the base station and the aerial UE, where the pre-compensation timing value is based on a location of the aerial UE. The operations of 1305 may be performed in accordance with examples as disclosed herein. In some examples, aspects of the operations of 1305 may be performed by an indication transmission component 725 as described with reference to FIG. 7.

At 1310, the method may include monitoring a set of random access resources for the random access message based on the indication, the set of random access resources associated with the pre-compensation timing value and the aerial UE. The operations of 1310 may be performed in accordance with examples as disclosed herein. In some examples, aspects of the operations of 1310 may be performed by a monitoring component 730 as described with reference to FIG. 7.

Figure 14:
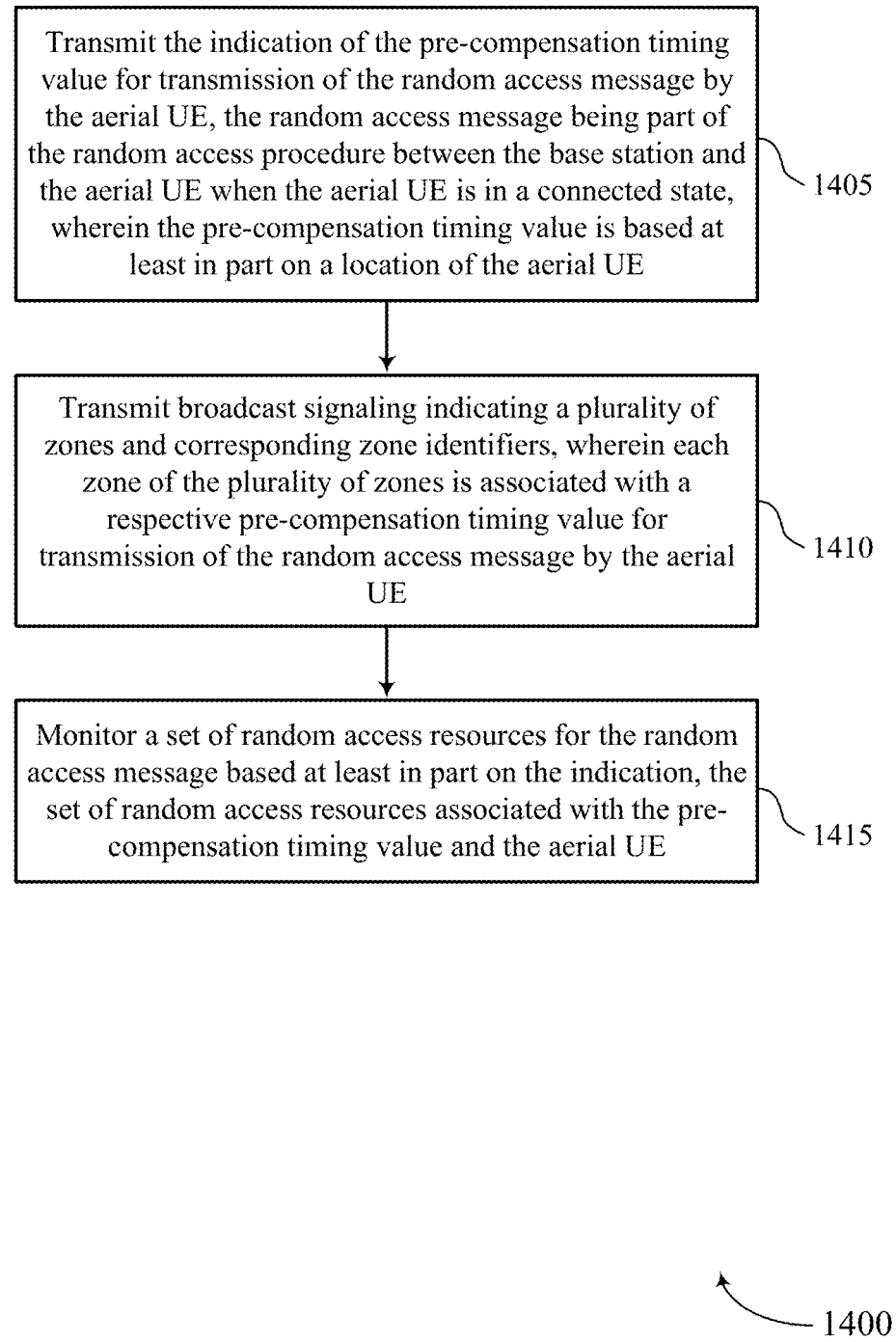

FIG. 14 shows a flowchart illustrating a method 1400 that supports random access for aerial UEs in a connected mode in accordance with aspects of the present disclosure. The operations of the method 1400 may be implemented by a base station or its components as described herein. For example, the operations of the method 1400 may be performed by a base station 105 as described with reference to FIGS. 1 through 8. In some examples, a base station may execute a set of instructions to control the functional elements of the base station to perform the described functions. Additionally or alternatively, the base station may perform aspects of the described functions using special-purpose hardware.

At 1405, the method may include transmitting the indication of the pre-compensation timing value for transmission of the random access message by the aerial UE, the random access message being part of the random access procedure between the base station and the aerial UE when the aerial UE is in a connected state, where the pre-compensation timing value is based on a location of the aerial UE. The operations of 1405 may be performed in accordance with examples as disclosed herein. In some examples, aspects of the operations of 1405 may be performed by an indication transmission component 725 as described with reference to FIG. 7.

At 1410, the method may include transmitting broadcast signaling indicating a set of multiple zones and corresponding zone identifiers, where each zone of the set of multiple zones is associated with a respective pre-compensation timing value for transmission of the random access message by the aerial UE. The operations of 1410 may be performed in accordance with examples as disclosed herein. In some examples, aspects of the operations of 1410 may be performed by a zone signaling component 735 as described with reference to FIG. 7.

At 1415, the method may include monitoring a set of random access resources for the random access message based on the indication, the set of random access resources associated with the pre-compensation timing value and the aerial UE. The operations of 1415 may be performed in accordance with examples as disclosed herein. In some examples, aspects of the operations of 1415 may be performed by a monitoring component 730 as described with reference to FIG. 7.

Figure 15:
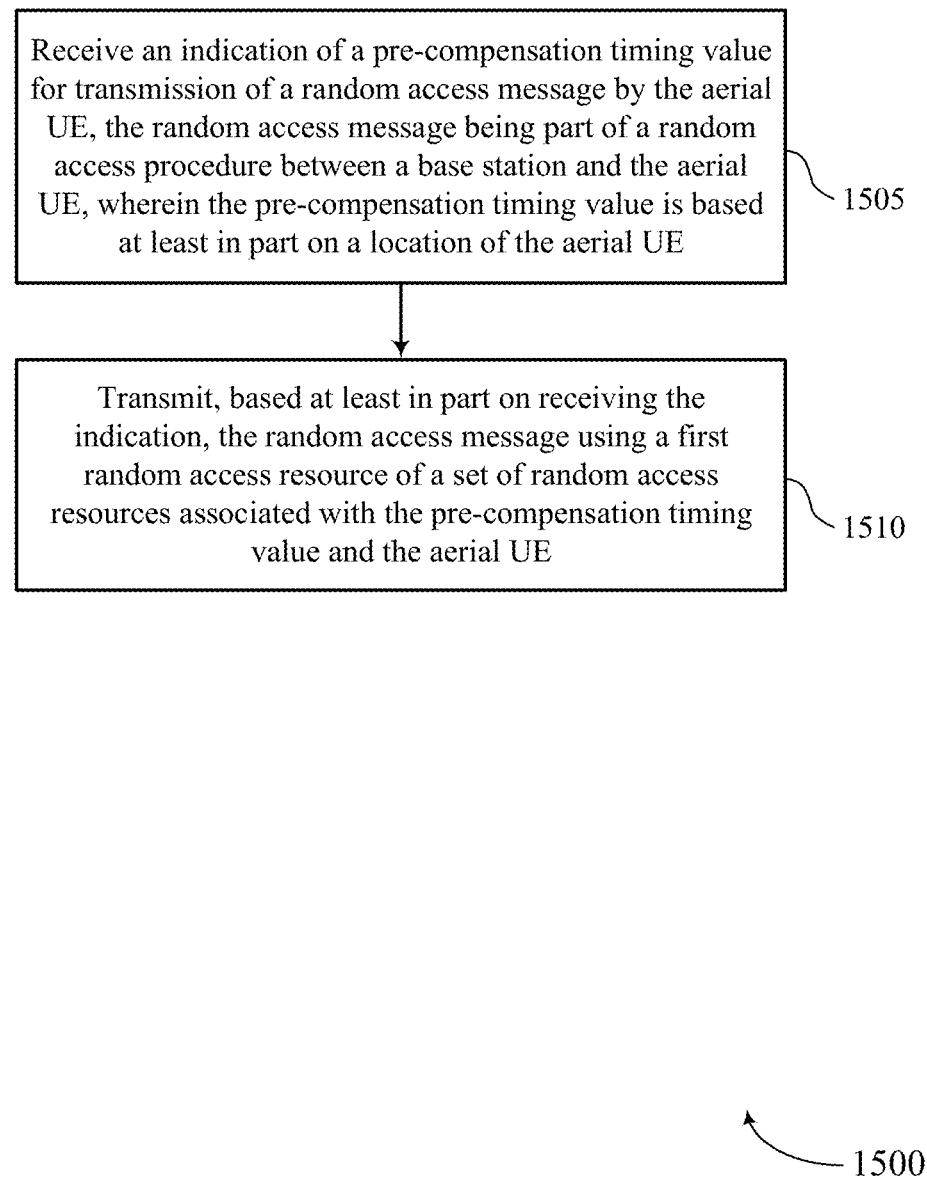

FIG. 15 shows a flowchart illustrating a method 1500 that supports random access for aerial UEs in a connected mode in accordance with aspects of the present disclosure. The operations of the method 1500 may be implemented by a UE or its components as described herein. For example, the operations of the method 1500 may be performed by a UE 115 as described with reference to FIGS. 1 through 4 and 9 through 12. In some examples, a UE may execute a set of instructions to control the functional elements of the UE to perform the described functions. Additionally or alternatively, the UE may perform aspects of the described functions using special-purpose hardware.

At 1505, the method may include receiving an indication of a pre-compensation timing value for transmission of a random access message by the aerial UE, the random access message being part of a random access procedure between a base station and the aerial UE, where the pre-compensation timing value is based on a location of the aerial UE. The operations of 1505 may be performed in accordance with examples as disclosed herein. In some examples, aspects of the operations of 1505 may be performed by an indication reception component 1125 as described with reference to FIG. 11.

At 1510, the method may include transmitting, based on receiving the indication, the random access message using a first random access resource of a set of random access resources associated with the pre-compensation timing value and the aerial UE. The operations of 1510 may be performed in accordance with examples as disclosed herein. In some examples, aspects of the operations of 1510 may be performed by a random access message component 1130 as described with reference to FIG. 11.

Figure 16:
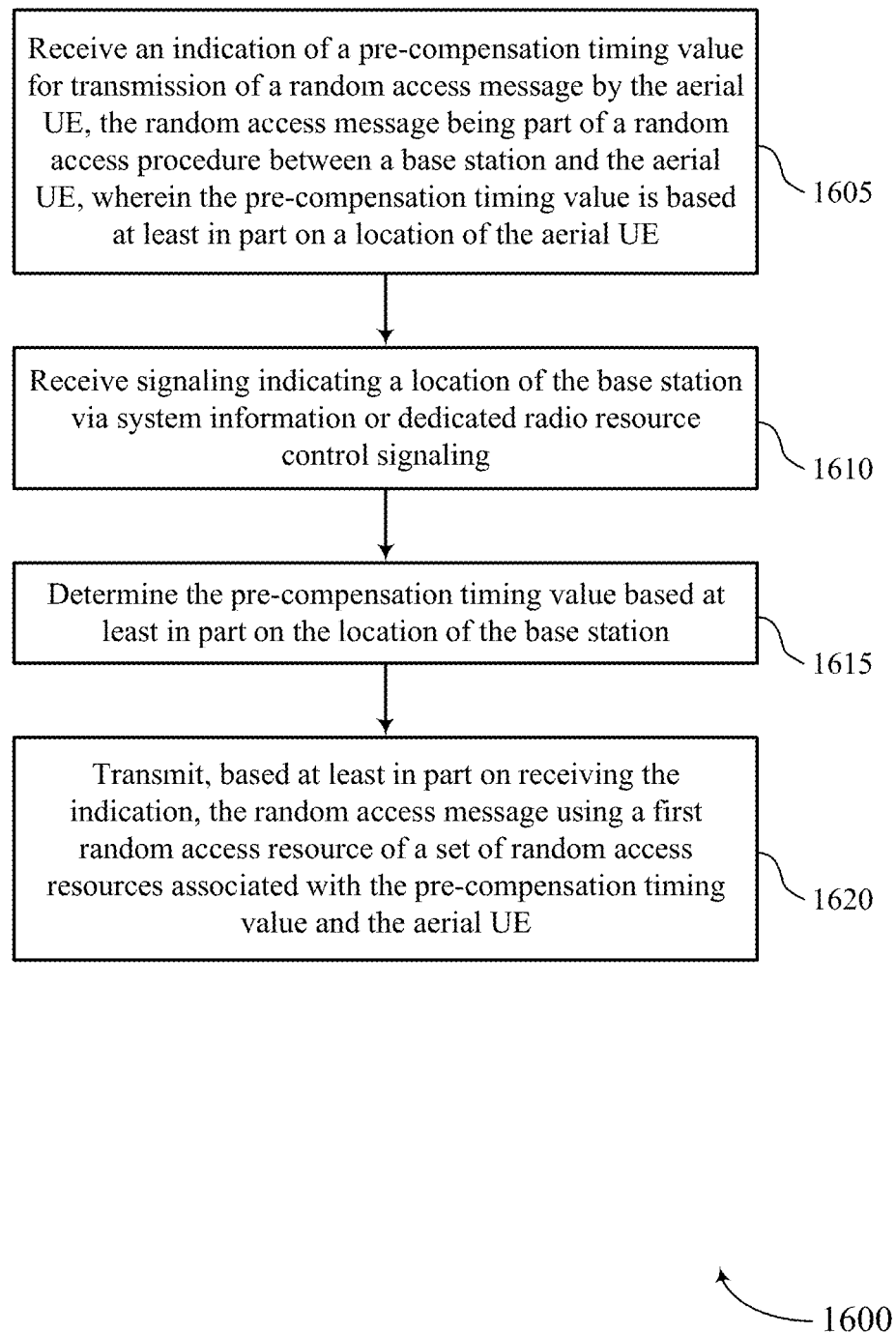

FIG. 16 shows a flowchart illustrating a method 1600 that supports random access for aerial UEs in a connected mode in accordance with aspects of the present disclosure. The operations of the method 1600 may be implemented by a UE or its components as described herein. For example, the operations of the method 1600 may be performed by a UE 115 as described with reference to FIGS. 1 through 4 and 9 through 12. In some examples, a UE may execute a set of instructions to control the functional elements of the UE to perform the described functions. Additionally or alternatively, the UE may perform aspects of the described functions using special-purpose hardware.

At 1605, the method may include receiving an indication of a pre-compensation timing value for transmission of a random access message by the aerial UE, the random access message being part of a random access procedure between a base station and the aerial UE, where the pre-compensation timing value is based on a location of the aerial UE. The operations of 1605 may be performed in accordance with examples as disclosed herein. In some examples, aspects of the operations of 1605 may be performed by an indication reception component 1125 as described with reference to FIG. 11.

At 1610, the method may include receiving signaling indicating a location of the base station via system information or dedicated RRC signaling. The operations of 1610 may be performed in accordance with examples as disclosed herein. In some examples, aspects of the operations of 1610 may be performed by an indication reception component 1125 as described with reference to FIG. 11.

At 1615, the method may include determining the pre-compensation timing value based on the location of the base station. The operations of 1615 may be performed in accordance with examples as disclosed herein. In some examples, aspects of the operations of 1615 may be performed by a timing value determination component 1135 as described with reference to FIG. 11.

At 1620, the method may include transmitting, based on receiving the indication, the random access message using a first random access resource of a set of random access resources associated with the pre-compensation timing value and the aerial UE. The operations of 1620 may be performed in accordance with examples as disclosed herein. In some examples, aspects of the operations of 1620 may be performed by a random access message component 1130 as described with reference to FIG. 11.

Figure 17:
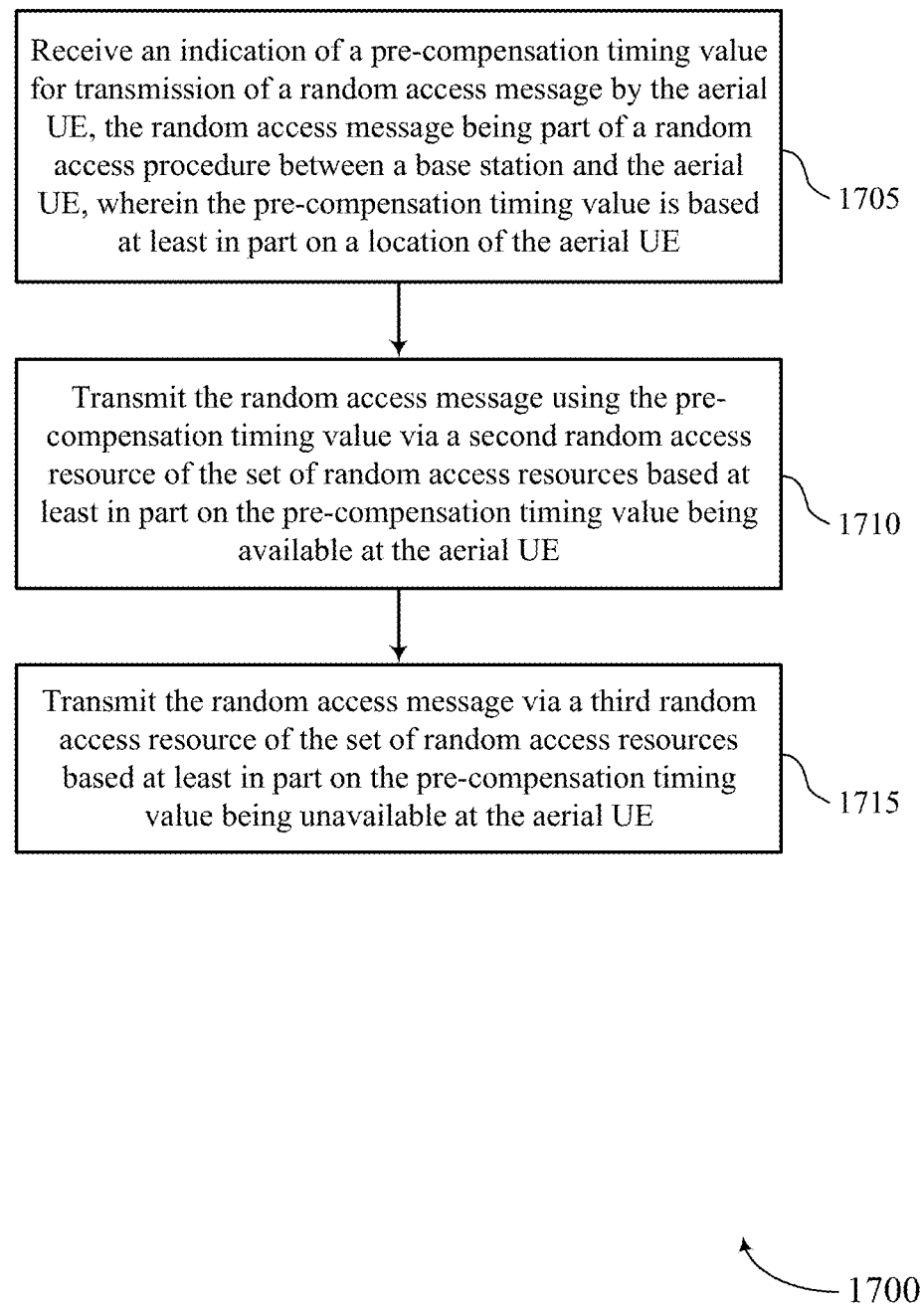

FIG. 17 shows a flowchart illustrating a method 1700 that supports random access for aerial UEs in a connected mode in accordance with aspects of the present disclosure. The operations of the method 1700 may be implemented by a UE or its components as described herein. For example, the operations of the method 1700 may be performed by a UE 115 as described with reference to FIGS. 1 through 4 and 9 through 12. In some examples, a UE may execute a set of instructions to control the functional elements of the UE to perform the described functions. Additionally or alternatively, the UE may perform aspects of the described functions using special-purpose hardware.

At 1705, the method may include receiving an indication of a pre-compensation timing value for transmission of a random access message by the aerial UE, the random access message being part of a random access procedure between a base station and the aerial UE, where the pre-compensation timing value is based on a location of the aerial UE. The operations of 1705 may be performed in accordance with examples as disclosed herein. In some examples, aspects of the operations of 1705 may be performed by an indication reception component 1125 as described with reference to FIG. 11.

At 1710, the method may include transmitting the random access message using the pre-compensation timing value via a second random access resource of the set of random access resources based on the pre-compensation timing value being available at the aerial UE. The operations of 1710 may be performed in accordance with examples as disclosed herein. In some examples, aspects of the operations of 1710 may be performed by a random access message component 1145 as described with reference to FIG. 11.

At 1715, the method may include transmitting the random access message via a third random access resource of the set of random access resources based on the pre-compensation timing value being unavailable at the aerial UE. The operations of 1715 may be performed in accordance with examples as disclosed herein. In some examples, aspects of the operations of 1715 may be performed by a random access message component 1145 as described with reference to FIG. 11.

The following provides an overview of aspects of the present disclosure:

Aspect 1: A method for wireless communications at a base station, comprising: transmitting an indication of a pre-compensation timing value for transmission of a random access message by an aerial UE, the random access message being part of a random access procedure between the base station and the aerial UE, wherein the pre-compensation timing value is based at least in part on a location of the aerial UE; and monitoring a set of random access resources for the random access message based at least in part on the indication, the set of random access resources associated with the pre-compensation timing value and the aerial UE.

Aspect 2: The method of aspect 1, wherein transmitting the indication of the pre-compensation timing value comprises: transmitting the indication of the pre-compensation timing value for transmission of the random access message by the aerial UE, the random access message being part of the random access procedure between the base station and the aerial UE when the aerial UE is in a connected state.

Aspect 3: The method of any of aspects 1 through 2, wherein transmitting the indication of the pre-compensation timing value comprises: transmitting, to the aerial UE, the indication of the pre-compensation timing value via RRC signaling, a MAC-CE, or DCI, wherein the pre-compensation timing value is specific to the aerial UE.

Aspect 4: The method of any of aspects 1 through 3, wherein transmitting the indication of the pre-compensation timing value comprises: transmitting an index corresponding to the pre-compensation timing value for transmission of the random access message by the aerial UE.

Aspect 5: The method of any of aspects 1 through 4, wherein transmitting the indication of the pre-compensation timing value comprises: transmitting broadcast signaling indicating a plurality of zones and corresponding zone identifiers, wherein each zone of the plurality of zones is associated with a respective pre-compensation timing value for transmission of the random access message by the aerial UE.

Aspect 6: The method of aspect 5, further comprising: transmitting, to the aerial UE and via a dedicated RRC message, an indication to activate a zone identifier for the aerial UE.

Aspect 7: The method of any of aspects 5 through 6, further comprising: transmitting, to the aerial UE and via a MAC-CE or DCI, a bitmap to activate a zone identifier for the aerial UE.

Aspect 8: The method of any of aspects 5 through 7, further comprising: maintaining a list comprising the plurality of zones and the respective pre-compensation timing values based at least in part on one or more measurements associated with one or more aerial UEs.

Aspect 9: The method of any of aspects 5 through 8, wherein each pre-compensation timing value corresponds to a minimum value for pre-compensation for a respective zone for a random access preamble transmission.

Aspect 10: The method of any of aspects 1 through 9, further comprising: receiving a capability message from the aerial UE, the capability message indicating a capability of the aerial UE to measure the location of the aerial UE, to apply a pre-compensation timing value, or both.

Aspect 11: The method of any of aspects 1 through 10, further comprising: transmitting a second message of the random access procedure after monitoring the set of random access resources for the random access message, the second message indicating a timing pre-compensation of the random access message.

Aspect 12: The method of any of aspects 1 through 11, wherein transmitting the indication of the pre-compensation timing value comprises: transmitting signaling indicating a location of the base station via system information or dedicated RRC signaling.

Aspect 13: The method of any of aspects 1 through 12, wherein transmitting the indication of the pre-compensation timing value comprises: transmitting signaling configuring the aerial UE with a pre-compensation timing value offset.

Aspect 14: The method of any of aspects 1 through 13, further comprising: receiving, based at least in part on completion of the random access procedure, a report indicating the pre-compensation timing value determined or used by the aerial UE.

Aspect 15: A method for wireless communications at an aerial UE, comprising: receiving an indication of a pre-compensation timing value for transmission of a random access message by the aerial UE, the random access message being part of a random access procedure between a base station and the aerial UE, wherein the pre-compensation timing value is based at least in part on a location of the aerial UE; and transmitting, based at least in part on receiving the indication, the random access message using a first random access resource of a set of random access resources associated with the pre-compensation timing value and the aerial UE.

Aspect 16: The method of aspect 15, wherein receiving the indication of the pre-compensation timing value comprises: receiving the indication of the pre-compensation timing value for transmission of the random access message by the aerial UE, the random access message being part of the random access procedure between the base station and the aerial UE when the aerial UE is in a connected state.

Aspect 17: The method of any of aspects 15 through 16, wherein receiving the indication of the pre-compensation timing value comprises: receiving signaling indicating a location of the base station via system information or dedicated RRC signaling; and determining the pre-compensation timing value based at least in part on the location of the base station.

Aspect 18: The method of any of aspects 15 through 17, wherein receiving the indication of the pre-compensation timing value comprises: receiving signaling configuring the aerial UE with a pre-compensation timing value offset; and determining the pre-compensation timing value based at least in part on the pre-compensation timing value offset.

Aspect 19: The method of any of aspects 15 through 18, further comprising: determining the pre-compensation timing value based at least in part on the location of the base station and the location of the aerial UE.

Aspect 20: The method of any of aspects 15 through 19, further comprising: transmitting, based at least in part on completion of the random access procedure, a report indicating the pre-compensation timing value determined by the aerial UE.

Aspect 21: The method of any of aspects 15 through 20, further comprising: transmitting the random access message using the pre-compensation timing value via a second random access resource of the set of random access resources based at least in part on the pre-compensation timing value being available at the aerial UE; and transmitting the random access message via a third random access resource of the set of random access resources based at least in part on the pre-compensation timing value being unavailable at the aerial UE.

Aspect 22: The method of any of aspects 15 through 21, further comprising: transmitting a capability message from the aerial UE, the capability message indicating a capability of the aerial UE to measure the location of the aerial UE, to apply a pre-compensation timing value, or both.

Aspect 23: The method of any of aspects 15 through 22, wherein receiving the indication of the pre-compensation timing value comprises: receiving, from the base station, the indication of the pre-compensation timing value via RRC signaling, a MAC-CE, or DCI, wherein the pre-compensation timing value is specific to the aerial UE.

Aspect 24: The method of any of aspects 15 through 23, wherein receiving the indication of the pre-compensation timing value comprises: receiving an index corresponding to the pre-compensation timing value for transmission of the random access message by the aerial UE.

Aspect 25: The method of any of aspects 15 through 24, wherein receiving the indication of the pre-compensation timing value comprises: receiving broadcast signaling indicating a plurality of zones and corresponding zone identifiers, wherein each zone of the plurality of zones is associated with a respective pre-compensation timing value for transmission of the random access message by the aerial UE.

Aspect 26: The method of aspect 25, further comprising: receiving, from the base station and via a dedicated RRC message, an indication to activate a zone identifier for the aerial UE.

Aspect 27: The method of any of aspects 25 through 26, further comprising: receiving, from the base station and via a MAC-CE or DCI, a bitmap to activate a zone identifier for the aerial UE.

Aspect 28: The method of any of aspects 25 through 27, wherein each pre-compensation timing value corresponds to a minimum value for pre-compensation for a respective zone for a random access preamble transmission.

Aspect 29: The method of any of aspects 15 through 28, further comprising:

receiving a second message of the random access procedure after transmitting the random access message, the second message indicating a timing pre-compensation of the random access message.

Aspect 30: An apparatus for wireless communications at a base station, comprising a processor; memory coupled with the processor; and instructions stored in the memory and executable by the processor to cause the apparatus to perform a method of any of aspects 1 through 14.

Aspect 31: An apparatus for wireless communications at a base station, comprising at least one means for performing a method of any of aspects 1 through 14.

Aspect 32: A non-transitory computer-readable medium storing code for wireless communications at a base station, the code comprising instructions executable by a processor to perform a method of any of aspects 1 through 14.

Aspect 33: An apparatus for wireless communications at an aerial UE, comprising a processor; memory coupled with the processor; and instructions stored in the memory and executable by the processor to cause the apparatus to perform a method of any of aspects 15 through 29.

Aspect 34: An apparatus for wireless communications at an aerial UE, comprising at least one means for performing a method of any of aspects 15 through 29.

Aspect 35: A non-transitory computer-readable medium storing code for wireless communications at an aerial UE, the code comprising instructions executable by a processor to perform a method of any of aspects 15 through 29.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communications at a base station, comprising:
    a processor;
    memory coupled with the processor; and
    instructions stored in the memory and executable by the processor to cause the apparatus to:
        transmit an indication of a pre-compensation timing value for transmission of a random access message by an aerial user equipment (UE), the random access message being part of a random access procedure between the base station and the aerial UE, wherein the pre-compensation timing value is based at least in part on a location of the aerial UE; and
        monitor a set of random access resources for the random access message based at least in part on the indication, the set of random access resources associated with the pre-compensation timing value and the aerial UE.

2. The apparatus of claim 1, wherein the instructions to transmit the indication of the pre-compensation timing value are executable by the processor to cause the apparatus to:
    transmit the indication of the pre-compensation timing value for transmission of the random access message by the aerial UE, the random access message being part of the random access procedure between the base station and the aerial UE when the aerial UE is in a connected state.

3. The apparatus of claim 1, wherein the instructions to transmit the indication of the pre-compensation timing value are executable by the processor to cause the apparatus to:
    transmit, to the aerial UE, the indication of the pre-compensation timing value via radio resource control signaling, a medium access control control element, or downlink control information, wherein the pre-compensation timing value is specific to the aerial UE.

4. The apparatus of claim 1, wherein the instructions to transmit the indication of the pre-compensation timing value are executable by the processor to cause the apparatus to:
    transmit an index corresponding to the pre-compensation timing value for transmission of the random access message by the aerial UE.

5. The apparatus of claim 1, wherein the instructions to transmit the indication of the pre-compensation timing value are executable by the processor to cause the apparatus to:
    transmit broadcast signaling indicating a plurality of zones and corresponding zone identifiers, wherein each zone of the plurality of zones is associated with a respective pre-compensation timing value for transmission of the random access message by the aerial UE.

6. The apparatus of claim 5, wherein the instructions are further executable by the processor to cause the apparatus to:
    transmit, to the aerial UE and via a dedicated radio resource control message, an indication to activate a zone identifier for the aerial UE.

7. The apparatus of claim 5, wherein the instructions are further executable by the processor to cause the apparatus to:
    transmit, to the aerial UE and via a medium access control control element or downlink control information, a bitmap to activate a zone identifier for the aerial UE.

8. The apparatus of claim 5, wherein the instructions are further executable by the processor to cause the apparatus to:
    maintain a list comprising the plurality of zones and the respective pre-compensation timing values based at least in part on one or more measurements associated with one or more aerial UEs.

9. The apparatus of claim 5, wherein each pre-compensation timing value corresponds to a minimum value for pre-compensation for a respective zone for a random access preamble transmission.

10. The apparatus of claim 1, wherein the instructions are further executable by the processor to cause the apparatus to:
    receive a capability message from the aerial UE, the capability message indicating a capability of the aerial UE to measure the location of the aerial UE, to apply a pre-compensation timing value, or both.

11. The apparatus of claim 1, wherein the instructions are further executable by the processor to cause the apparatus to:
   transmit a second message of the random access procedure after monitoring the set of random access resources for the random access message, the second message indicating a timing pre-compensation of the random access message.

12. The apparatus of claim 1, wherein the instructions to transmit the indication of the pre-compensation timing value are executable by the processor to cause the apparatus to:
   transmit signaling indicating a location of the base station via system information or dedicated radio resource control signaling.

13. The apparatus of claim 1, wherein the instructions to transmit the indication of the pre-compensation timing value are executable by the processor to cause the apparatus to:
   transmit signaling configuring the aerial UE with a pre-compensation timing value offset.

14. The apparatus of claim 1, wherein the instructions are further executable by the processor to cause the apparatus to:
   receive, based at least in part on completion of the random access procedure, a report indicating the pre-compensation timing value determined or used by the aerial UE.

15. An apparatus for wireless communications at an aerial user equipment (UE), comprising:
   a processor;
   memory coupled with the processor; and
   instructions stored in the memory and executable by the processor to cause the apparatus to:
      receive an indication of a pre-compensation timing value for transmission of a random access message by the aerial UE, the random access message being part of a random access procedure between a base station and the aerial UE, wherein the pre-compensation timing value is based at least in part on a location of the aerial UE; and
      transmit, based at least in part on receiving the indication, the random access message using a first random access resource of a set of random access resources associated with the pre-compensation timing value and the aerial UE.

16. The apparatus of claim 15, wherein the instructions to receive the indication of the pre-compensation timing value are executable by the processor to cause the apparatus to:
   receive the indication of the pre-compensation timing value for transmission of the random access message by the aerial UE, the random access message being part of the random access procedure between the base station and the aerial UE when the aerial UE is in a connected state.

17. The apparatus of claim 15, wherein the instructions to receive the indication of the pre-compensation timing value are executable by the processor to cause the apparatus to:
   receive signaling indicating a location of the base station via system information or dedicated radio resource control signaling; and
   determine the pre-compensation timing value based at least in part on the location of the base station.

18. The apparatus of claim 15, wherein the instructions to receive the indication of the pre-compensation timing value are executable by the processor to cause the apparatus to:
   receive signaling configuring the aerial UE with a pre-compensation timing value offset; and
   determine the pre-compensation timing value based at least in part on the pre-compensation timing value offset.

19. The apparatus of claim 15, wherein the instructions are further executable by the processor to cause the apparatus to:
   determine the pre-compensation timing value based at least in part on the location of the base station and the location of the aerial UE.

20. The apparatus of claim 15, wherein the instructions are further executable by the processor to cause the apparatus to:
   transmit, based at least in part on completion of the random access procedure, a report indicating the pre-compensation timing value determined by the aerial UE.

21. The apparatus of claim 15, wherein the instructions are further executable by the processor to cause the apparatus to:
   transmit the random access message using the pre-compensation timing value via a second random access resource of the set of random access resources based at least in part on the pre-compensation timing value being available at the aerial UE; and
   transmit the random access message via a third random access resource of the set of random access resources based at least in part on the pre-compensation timing value being unavailable at the aerial UE.

22. The apparatus of claim 15, wherein the instructions are further executable by the processor to cause the apparatus to:
   transmit a capability message from the aerial UE, the capability message indicating a capability of the aerial UE to measure the location of the aerial UE, to apply a pre-compensation timing value, or both.

23. The apparatus of claim 15, wherein the instructions to receive the indication of the pre-compensation timing value are executable by the processor to cause the apparatus to:
   receive, from the base station, the indication of the pre-compensation timing value via radio resource control signaling, a medium access control control element, or downlink control information, wherein the pre-compensation timing value is specific to the aerial UE.

24. The apparatus of claim 15, wherein the instructions to receive the indication of the pre-compensation timing value are executable by the processor to cause the apparatus to:
   receive an index corresponding to the pre-compensation timing value for transmission of the random access message by the aerial UE.

25. The apparatus of claim 15, wherein the instructions to receive the indication of the pre-compensation timing value are executable by the processor to cause the apparatus to:
   receive broadcast signaling indicating a plurality of zones and corresponding zone identifiers, wherein each zone of the plurality of zones is associated with a respective pre-compensation timing value for transmission of the random access message by the aerial UE.

26. The apparatus of claim 25, wherein the instructions are further executable by the processor to cause the apparatus to:
   receive, from the base station and via a dedicated radio resource control message, an indication to activate a zone identifier for the aerial UE.

27. The apparatus of claim 25, wherein the instructions are further executable by the processor to cause the apparatus to:

receive, from the base station and via a medium access control control element or downlink control information, a bitmap to activate a zone identifier for the aerial UE.

28. The apparatus of claim 25, wherein each pre-compensation timing value corresponds to a minimum value for pre-compensation for a respective zone for a random access preamble transmission.

29. A method for wireless communications at a base station, comprising:

transmitting an indication of a pre-compensation timing value for transmission of a random access message by an aerial user equipment (UE), the random access message being part of a random access procedure between the base station and the aerial UE, wherein the pre-compensation timing value is based at least in part on a location of the aerial UE; and monitoring a set of random access resources for the random access message based at least in part on the indication, the set of random access resources associated with the pre-compensation timing value and the aerial UE.

30. A method for wireless communications at an aerial user equipment (UE), comprising:

receiving an indication of a pre-compensation timing value for transmission of a random access message by the aerial UE, the random access message being part of a random access procedure between a base station and the aerial UE, wherein the pre-compensation timing value is based at least in part on a location of the aerial UE; and transmitting, based at least in part on receiving the indication, the random access message using a first random access resource of a set of random access resources associated with the pre-compensation timing value and the aerial UE.

* * * * *